United States Patent [19]

Smith et al.

[11] Patent Number: 6,052,693
[45] Date of Patent: Apr. 18, 2000

[54] SYSTEM FOR ASSEMBLING LARGE DATABASES THROUGH INFORMATION EXTRACTED FROM TEXT SOURCES

[75] Inventors: Michael J. Smith, Stockport; Alan C. May, Manchester, both of United Kingdom; Barton D. Wright, Auburndale, Mass.; Adrian J. Wilson, Didsbury; Neale Hayward-Shott, Cheadle, both of United Kingdom

[73] Assignee: Harlequin Group Plc, United Kingdom

[21] Appl. No.: 08/674,502

[22] Filed: Jul. 2, 1996

[51] Int. Cl.⁷ .................................................. G06F 17/30
[52] U.S. Cl. ........................................ 707/104; 707/102
[58] Field of Search ............................ 705/2; 707/5, 3, 707/1, 10, 102, 104; 395/708; 704/1, 4

[56] References Cited

U.S. PATENT DOCUMENTS

| | | | |
|---|---|---|---|
| 4,965,763 | 10/1990 | Zamora | 704/1 |
| 5,287,278 | 2/1994 | Rau | 704/1 |
| 5,297,039 | 3/1994 | Kanaegami et al. | 707/5 |
| 5,432,931 | 7/1995 | Woess et al. | 707/10 |
| 5,432,942 | 7/1995 | Trainer | 395/708 |
| 5,469,354 | 11/1995 | Hatakeyama et al. | 707/3 |
| 5,528,491 | 6/1996 | Kuno et al. | 704/9 |
| 5,537,586 | 7/1996 | Amram et al. | 707/3 |
| 5,628,003 | 5/1997 | Fujisawa et al. | 707/104 |
| 5,642,520 | 6/1997 | Takeshita et al. | 704/3 |
| 5,664,109 | 9/1997 | Johnson et al. | 705/2 |
| 5,768,580 | 6/1998 | Wical | 707/102 |
| 5,826,252 | 10/1998 | Woltes, Jr. et al. | 707/1 |

OTHER PUBLICATIONS

Jim Cowie, Wendy Lenhart, "Information Extraction", Communications of the ACM, Jan. 1996, vol. 39, No. 1, pp. 80–91.

Jerry R. Hobbs, "The Generic Information Extraction System", Fifth Message Understanding Conference (MUC–5), Aug. 1993, pp. 87–91.

D. Yizik Brenman, Amy Coppola, Jodie Kalikow, "A Guide to Oracle ConText™ Version 1.1, Questions and Answers", Part A17148, Oracle Corporation, Jul. 1994.

B. Onyshkenvych, M.E. Okurowski, L. Carson, "Tasks, Domains And Languages", Fifth Message Understanding Conference (MUC–5), Aug. 1993, pp. 7–17.

(List continued on next page.)

*Primary Examiner*—Thomas G. Black
*Assistant Examiner*—Charles L. Rones
*Attorney, Agent, or Firm*—Fliesler Dubb Meyer & Lovejoy, LLP

[57] ABSTRACT

Traditional information extraction processes are usually implemented on a programmed general purpose computer. The process looks for certain information, and organizes the information into a database record. The database created is usually stored in a searchable format such as a structured relational database or an object-orientated structured database, which can be accessed, research, and analyzed by computer-implemented database research systems. However, generic information extraction processes only input the extracted information into the database, in the last step of the process and do not address the problem of compiling large and comprehensive database from a plurality of source documents. Furthermore, information extraction processes are not focused on how the information extracted will be used in the construction of a large database. It would be desirable to have an information extraction system with the ability to assemble extracted information and to recognize any conflicts between the extracted information and the contents of an existing database. Accordingly, the invention is an information indexing process with the above features having the ability to construct a database with a high degree of integrity from a plurality of source documents.

16 Claims, 6 Drawing Sheets

Microfiche Appendix Included
(5 Microfiche, 290 Pages)

OTHER PUBLICATIONS

R. Grishman, "Design of the MUC–6 Evaluation", Sixth Message Understanding Conference (MUC–6), Nov. 1995, Morgan Kauffmann Publishers, Inc., San Francisco, pp. 1–11.

B.M. Sundheim, "Overview of the Results of the MUC–6 Evaluation", Sixth Message Understanding Conference (MUC–6), Nov. 1995, Morgan Kauffman Publishers, Inc., San Francisco, pp. 13–31.

R. Weischedel, "BBN: Description of the PLUM System as Used for MUC–6", Sixth Message Understanding Conference (MUC–6), Nov. 1995, Morgan Kaufmann Publishers, Inc., San Francicsco, pp. 55–69.

D. Lin "Univeristy of Manitoba: Description of the PIE System Used for MUC–6", Sixth Message Understanding Conference (MUC–6), Nov. 1995, Morgan Kaufmann Publishers, Inc., San Francisco, pp. 113–126.

A. Borosovsky, "Knight–Ridder Information's Value Adding Name Finder: A Variation on the Theme of FASTUS", Sixth Message Understanding Conference (MUC–6), Nov. 1995, San Francisco, pp. 87–95.

L. Childs, D. Brady, L. Guthrie, J. Franco, D. Valdes–Dapena, B. Reid, J. Kielty, G. Dierkes and I.Sider, "Lockheed Martin: Louella Parsing, an NLToolset System for MUC–6", Sixth Message Understanding Conference (MUC–6), Nov. 1995, San Francisco, pp. 97–111.

R. Morgan, R. Garigliano, P. Callaghan, S. Poria, M. Smith, A. Urbanowicz, R. Collingham, M. Costantino, C. Cooper, and the Lolita Group, "University of Durham: Description of the Lolita System as Used in MUC–6", Sixth Message Understanding Conference (MUC–6), Nov. 1995, Morgan Kaufmann Publishers, Inc., San Francisco, pp. 71–85.

J. Cowie, "CRL/NMSU: Description of ther CRL/NMSU Systems Used for MUC–6", Sixth Message Understanding Conference (MUC–6), Nov. 1995, Morgan Kaufmann Publishers, Inc., San Francisco, pp. 157–166.

R. Grishman, "The NYU System for MUC–6 or Where's the Syntax?", Sixth Message Understanding Conference (MUC–6), Nov. 1995, Morgan Kaufmann Publishers, Inc., San Francisco, pp. 167–175.

R. Lee, "Sterling Software: AN NLToolset–Based System for MUC–6", Sixth Message Understanding Conference (MUC–6), Nov. 1995, Morgan Kaufmann Publishers, Inc., San Francisco, pp. 249–261.

L. Miller, "Description of the SAIC DX System as Used for MUC–6", Sixth Message Understanding Conference (MUC–6), Nov. 1995, Morgan Kaufmann Publishers, Inc., San Francisco, pp. 193–206.

G. Krupa, "SRA: Description of the SRA System as Used for MUC–6", Sixth Message Understanding Conference (MUC–6), Nov. 1995, Morgan Kaufman Publishers, Inc., San Francisco, pp. 221–235.

D. Fisher, S. Soderland, J. McCarthy, F. Feng and W. Lenhert, "Description of the UMass System as Used for MUC–6", Sixth Message Understanding Conference (MUC–6), Nov. 1995, San Francisco, pp. 127–140.

J. Aberdeen, J. Burger, D.Day. L. Hirschmann, P. Robinson and M. Vilain, "Mitre: Description of the Alembic System Used for MUC–6", Sixth Message Understanding Conference (MUC–6), Nov. 1995, pp. 141–155.

B. Baldwin, J. Reynar, M. Collins, J. Eisner, A. Ratnaparkhi, J. Rosenzweig, A. Srinivas, "University of Pennsylvania: Description of the University of Pennsylvania System Used for MUC–6", Sixth Message Understanding Conference (MUC–6), Nov. 1995, pp. 177–191.

R. Gaizauskas, T. Wakao, K. Humphreys, H. Cunningham, Y. Wilks "University of Sheffield, Description of the LaSIE System as Used for MUC–6", Sixth Message Understanding Conference (MUC–6), Nov. 1995, Morgan Kaufmann Publishers, Inc., San Francisco, pp. 207–220.

D. Appelt, J. Hobbs, J. Bear, D. Isreal, M. Kameyama, A. Kehler, D. Martin, K. Myers and M. Tyson, "SRI International Fastus System: MUC–6 Test Results and Analysis", Sixth Message Understanding Conference (MUC–6), Nov. 1995, San Francisco, pp. 237–248.

L. Iwanska, M. Crool., T. Yoon, M. Adams, "Wayne State University: Description of the UNO National Language Processing System as Used for MUC–6", Sixth Message Understanding Conference (MUC–6), Nov. 1995, Morgan Kaufmann Publishers, San Francisco, pp. 263–277.

SYSTEM FOR ASSEMBLING LARGE DATABASES THROUGH INFORMATION EXTRACTED FROM TEXT SOURCES

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyrights whatsoever.

37 C.F.R. 1.96 MICROFICHE (5 SHEETS/290 FRAMES) APPENDIX

Attached in microfiche is the MASTER.XLS spreadsheet specifying the required content of the Structured entity relationship model and all Entities, Links, Attributes and their values and the SOL Inserts used to set up the Research Strategy, Strategy Groups and Strategy Rules as used in the preferred embodiment of the invention. Furthermore, Appendix contains the Grammar Rules, the Application Data Tables, Application Definitions, and Research Rules as used in the prefered embodiment as specified below.

FIELD AND BACKGROUND OF THE INVENTION

The invention relates generally to natural language processing systems and information extraction processes that involve the extraction of information from source documents. An information extraction process should be distinguished from two other natural language processes: text or informational retrieval processes and text understanding processes. Text or informational retrieval processes typically identify documents from a library of documents by matching of words or phrases contained within the documents. Text understanding processes aim to interpret the complete meaning of entire texts, including the text's subtle nuances of meaning and complexities of language.

Traditional information extraction processes are usually implemented on a programmed general purpose computer. The process looks for certain information in the text, extracts the information, and organizes the information into a database records. The database created is usually stored in a searchable format, such a structured relational database or an object-oriented structured database, which can be accessed, research, and analyzed by computer-implemented database research systems.

In "The Generic Information Extraction System", Proceedings of the Fifth Message Understanding Conference (MUC-5), 1993, by J. R. Hobbs describes a generic information extraction system in ten steps. First, a text zoner, turns a text into a set of text segments, then a pre-processor turns a text or text segment into a sequence of sentences, each of which is a sequence of lexical terms, where a lexical item is a word together with its lexical attributes. Third, a filter turns a set of sentences into a smaller set of sentences by filtering out the irrelevant sentences. Fourth, a preparser takes a sequence of lexical items and tries to identify various determinable small-scale structures. Fifth, a parser produces a set of parse tree fragments from the sequence of lexical terms and small-scale structures. Sixth, a fragment combiner combines the fragments into a parse tree or logical form. Seventh, a semantic interpreter generates a semantic structure from the parse tree or logical form. Eighth, a lexical disambiguator replaces general or ambiguous predicates in the semantic structure with specific and unambiguous predicates. Ninth, a discourse or conference resolution processor turns the tree-like semantic structure into a network like structure by identifying different descriptions of the same entity in different parts of the text. Finally, a template generator derives the output template from the final semantic structure. Accordingly in "Tasks, Domains, and Languages", Proceedings of the Fifth Message Understanding Conference (MUC-5), 1993, by B. Onyshkevych et al. the tasks requested of the information extraction systems evaluated at MUC-5 focused on the systems' ability to automatically fill one singular object-oriented template with information extracted from a source of free text.

However, the generic information extraction process described above only inputs the extracted information into the database, or template, in the last step of the process, and does not address the problem of compiling or aggregating a large and comprehensive database from a plurality of source documents.

In addition, the information extraction processes do not address the problem of compiling or aggregating information extracted from both structured and unstructured source material, i.e. free text, forms.

Furthermore, the information extraction processes are not focused on how the information extracted will be used in the construction of a large database. It would be a desirable feature to have an information extraction system with the ability to assemble extracted information and to recognize any conflicts between the extracted information and the contents of an existing database. It would also be a desirable feature for this information extraction and assemblage system, or information indexing system, to fully analyze the extracted information in a comprehensive and intelligent manner to provide a full range of options and alternatives to the user to resolve any inconsistencies between the extracted information and the database under construction.

Another desirable feature would be for the system for the information indexing system to have the capacity of maintaining conflicts and fragments of incomplete information until they are resolved at a later date.

Accordingly, an information indexing system with the above features would have the ability to construct a database with a high degree of integrity from information extracted from a plurality of source documents.

SUMMARY OF THE INVENTION

The invention is an information indexing system which has the ability to create a database with a high degree of integrity from a plurality of text containing source documents. The invention is a system of combining information extracted from a plurality of different text containing source documents to produce a final databases with a high degree of integrity, that is a database built to contain information with both the maximum amount of corroboration possible, and maximum amount of cross-referencing for uncorroborated or ambiguous information. In the preferred embodiment of the invention, as described below, it is an additional feature of the invention that the information indexing system increases the efficiency of data collection and analysis in the preferred embodiment's application domain in criminal investigation procedures and analysis.

It is an additional feature of the invention that information extracted from a source document can be extracted from both the free text within a document and additional information presented in any structured format within the document. An example in the preferred embodiment's application domain, would be the free text contained in a transcript of a witness's statement and pertinent information about the witness's statement itself as stated in the box portion of the witness statement form.

It is an additional feature of the invention that the system identifies any inconsistencies or conflicts between the proposed database and the database under construction and not only provides proposed solutions to the inconsistencies or ambiguities, but also provides a method for storing and cross-referencing inconsistencies and ambiguities.

The features and advantages described in the specification are not all-inclusive, and particularly, many additional features and advantages will be apparent to one of ordinary skill in the art in view of the drawings, specification, and claims hereof. Moreover, it should be noted that the language used in the specification has principally been selected for readability and instruction purposes, and may not have been selected to delineate or circumscribe the inventive subject matter, resort to the claims being necessary to determine such inventive subject matter.

DETAILED DESCRIPTION OF THE PREFERRED EMBODIMENT

Figure 1:
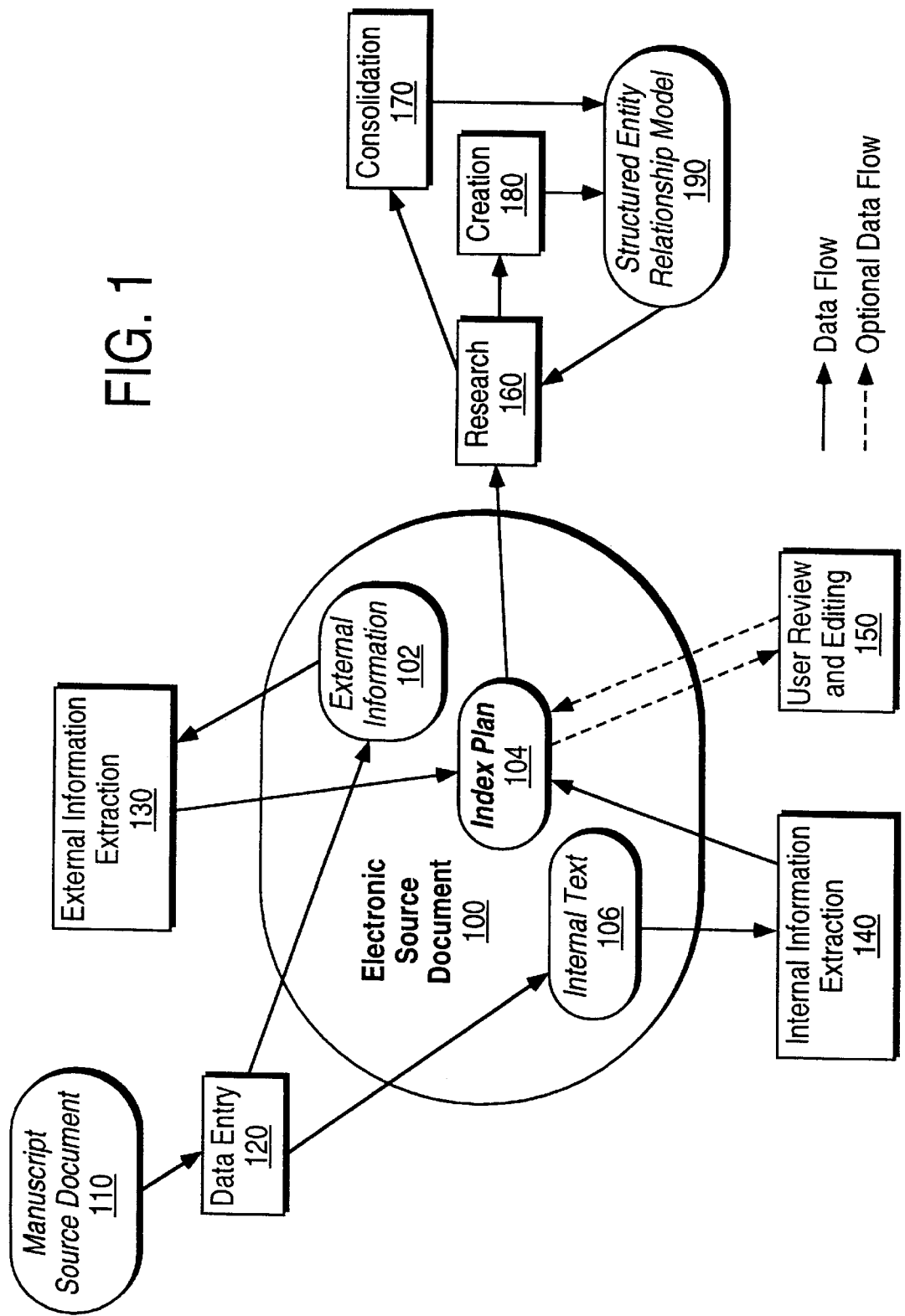
FIG. 1 is a representation of the information indexing process in accordance with the present invention.

In the preferred embodiment, the application domain is in criminal investigation systems and has been based upon, but not restricted to, established procedures, rules and conventions for incident rooms as published by the United Kingdom's Home Office, namely the Major Incident Room Standard Application Procedures (MIRSAP) and Rules and Conventions. These procedures cover document flow, processing and management that occurs in major investigation incident room which is established by the police forces of the United Kingdom in the investigation of major crimes. In addition, the police force of the United Kingdom adopted standardized definitions and formats for creation and maintenance of entities' types and types of relationships, links or cross-references, employed to analyze the factual information collected by the police force. Both of these procedures define the main types of document, entity, and links between documents and entities used in criminal investigation in the United Kingdom.

In this application domain, the objective of the process is to extract information about the multitude of entities discovered in the criminal investigation process and to build a database in the form of a structured entity relationship model of entities and links, which includes the source documents themselves, in a structured entity relationship model. In the preferred embodiment, for example, the objective is to construct a database to represent the people, vehicles, addresses, telephones, events and their inter-relationships, which are either mentioned in the text of such documents, or else recorded and associated with the source document itself. For example, a witness statement is recorded in manuscript form on specially designed pre-printed paper forms. On these forms there are spaces for the name of the witness, some details of the witness, e.g. age, sex, place of birth, occupation, together their home address, home telephone number, business address and business telephone number. Also on the printed paper form is space for the written free text of the statement, with continuation sheets if more room is required. A document can thus be thought of as two parts: the written text, henceforth referred to as the internal text, and the information contained in the boxes or structured portion of the source document, henceforth referred to as the external information. For example, a witness statement will carry external information on the author's surname, first names, date of birth, occupation, home address and other information. In this regards, in the preferred embodiment both the internal text and the external information from a source document have to be processed and entered into the structured entity relationship model.

In criminal investigation systems and the preferred embodiment there are six types of manuscript source documents used in the information indexing process. These are Witness Statements, Reports from Officers, Messages, Actions, Personal Description Forms and a catch-all category known as Other-Documents.

In the preferred embodiment the invention uses the following entity types: Nominal, Vehicle, Telephone, Location, Event, Sequence, Category and User Object. A Nominal entity type refers to a person and all the attributes associated with that person. But as stated above the various entities identified from a manuscript source document are not sufficient in themselves for the structured entity relational database. Relationships or links are used to represented any connection between any entity and any other entities, or any entity and source document.

A link contains information uniquely identifying the entities or links which it links, together with information on the precise nature of the relationship being represented. For example a father-daughter relationship link between Nominal N1 and Nominal N2 would carry the following information (Relative, N1, Father, N2, Daughter) plus the database identifiers for the two Nominal Records involved and itself. This unambiguously defines a Relative relationship, in which N1 is the Father and N2 is the Daughter.

Although not distinguished in the preferred embodiment, links arise out of two representational requirements. First there are those representation requirements of the application domain. For example, a source document may describe a relationship between two entities, and this relationship needs to be represented in the structured entity relationship model. This would be the case in the Father-Daughter example used above. Second, in the preferred embodiment's application domain it is important to record the source, or provenance, of any information placed in the structured entity relationship model. Accordingly, in the application domain of the preferred embodiment this provenance information is relied upon to corroborate evidence and in preparing for court presentations.

The preferred embodiment implements the provenance feature by treating the source document as an entity itself.

Thus in the preferred embodiment entities which are either created, modified, or merely corroborated as a result of extracting information from a source document, are linked to that source document.

The full categories all entities, entity types, links and link types as used in the preferred embodiment are set forth in the MASTER.XLS spreadsheet attached in microfiche Appendix A, as below.

The preferred embodiment operates on an industry standard general purpose personal computer, with a minimum configuration of an Intel PENTIUM™ 133 Mhz processor, 32 MB main memory, SVGA high resolution monitor with a minimum resolution of 1024×768, and 30 MB of disk space for installation, plus a minimum of 4 MB for each incident database. Software used for the preferred embodiment is Microsoft's WINDOWS™ for WORKGROUPS™ 3.11, or Microsoft's windows™ 3.1 as the underlying operating system. The software used to construct the preferred embodiment is written in PowerSoft's POWERBUILDER™, version 4.0. A particular feature of the PowerBuilder program is the programs' ability to create a forms style user interface that retrieves and updates information from a relational database. PowerBuilder also provides a library of Objects and Controls and also an Application Library which can be used as the basis on which to build a new application. PowerBuilder supports a range of established datatypes, such as integers, strings, decimals, logicals, and such like. The preferred embodiment also uses PowerSoft's relational database, WATCOM™ SQL version 3.0 and ODBC INTERFACE,™ version 3.0.

The partial parser and other elements of the automatic indexing system as described below were written in C/C++ for efficiency, with PowerSoft's CLASSBUILDER™ being used to build the interface between the C/C++ code and PowerBuilder Code. The WATCOM™ C/C++ compiler is used to generate a Dynamically Linked Library (DLL) which is then integrated into the main PowerBuilder™ Application.

The text editing control function in the preferred embodiments based upon on HIGHEDIT™ 3.0, from Heiler Software, which is supplied as a DLL. This provides programmable word processing capabilities for the internal text of electronic source document 106 as described below. The internal text of the source documents is represented in Microsoft's Rich Text Format. The HIGHEDIT™ control supports a library of interface functions and direct user manipulation functions, such that text can be entered into source documents then edited and marked-up for indexing.

In the preferred embodiment, each source document is represented by a record entry in each of three database tables. First, for each source document type there is a corresponding Source Document Table. This table has at least one column or field for each value in the external information of the manuscript source document. For example for a witness statement there would be fields for each of Surname, Forename1, Forename2, Street Name, District, and Town which appear on the manuscript source document. Additional fields can be defined which can be used for implementation convenience or other purposes. Second a record entry is made in a central Index Plan Table. This record has one column for the Source Document Identifier, which is used to Join to the Source Document Table, and one column for the Index Plan itself which is represented by Watcom's Long varchar, which in turn is a variable length string of unlimited size. Third, a record entry is made in a central Internal Text Table. This record has one column for the Source Document Identifier, which is used to Join to the Source Document Table, and one column for the Internal Text itself, which is represented by Watcom™'s Long varchar, which in turn is a variable length string of unlimited size. A Join across these three database tables based on a Source Document Identifier, yields a record containing all the information of a Source Document.

An added feature of the preferred embodiment is that the information extracted from a source document includes both the internal text and the external information of each source document. This internal text and external information is subsequently added into the structured entity relationship model, in a manner which maintains the integrity and consistency of the structured entity relationship model, and also avoids duplication of records.

In the preferred embodiment, the initial framework of the information indexing system is initialized from external data files. This framework comprises all the database tables required to store the structured entity relationship model, all other database tables required by the run-time application, and all the definitions held by the Definitions Server. These definitions comprise descriptions of Entities, Source Documents and Relationships, descriptions of all attributes thereof, validation rules for attribute values, field lookup tables for enumerated attribute values, and descriptions of Document Forms. The Definitions Server itself is implemented as a PowerBuilder User Object which can service a variety of requests as described in microfiche Appendix A.

THE INDEX PLAN

As referred to in FIG. 1, the diagram provides a representation of the information indexing process as implemented in the preferred embodiment. In the preferred embodiment the information indexing process uses an index plan 104 as a vehicle for storing and representing the initial or proposed information extracted from the manuscript source document 110, and for the organization of information and data throughout all the steps of the information indexing process.

In the preferred embodiment each source document 110 has its own associated database record, index plan 104, and internal text 106. The index plan 104 is held in a central, common index plan table. A source document ID is used as a foreign key in order to join this index plan table with the appropriate source document table. In this index plan 104 table the index plan 104 of each source document is represented by Watcom's Long Varchar datatype, a variable length string type of unlimited length.

Figure 2:
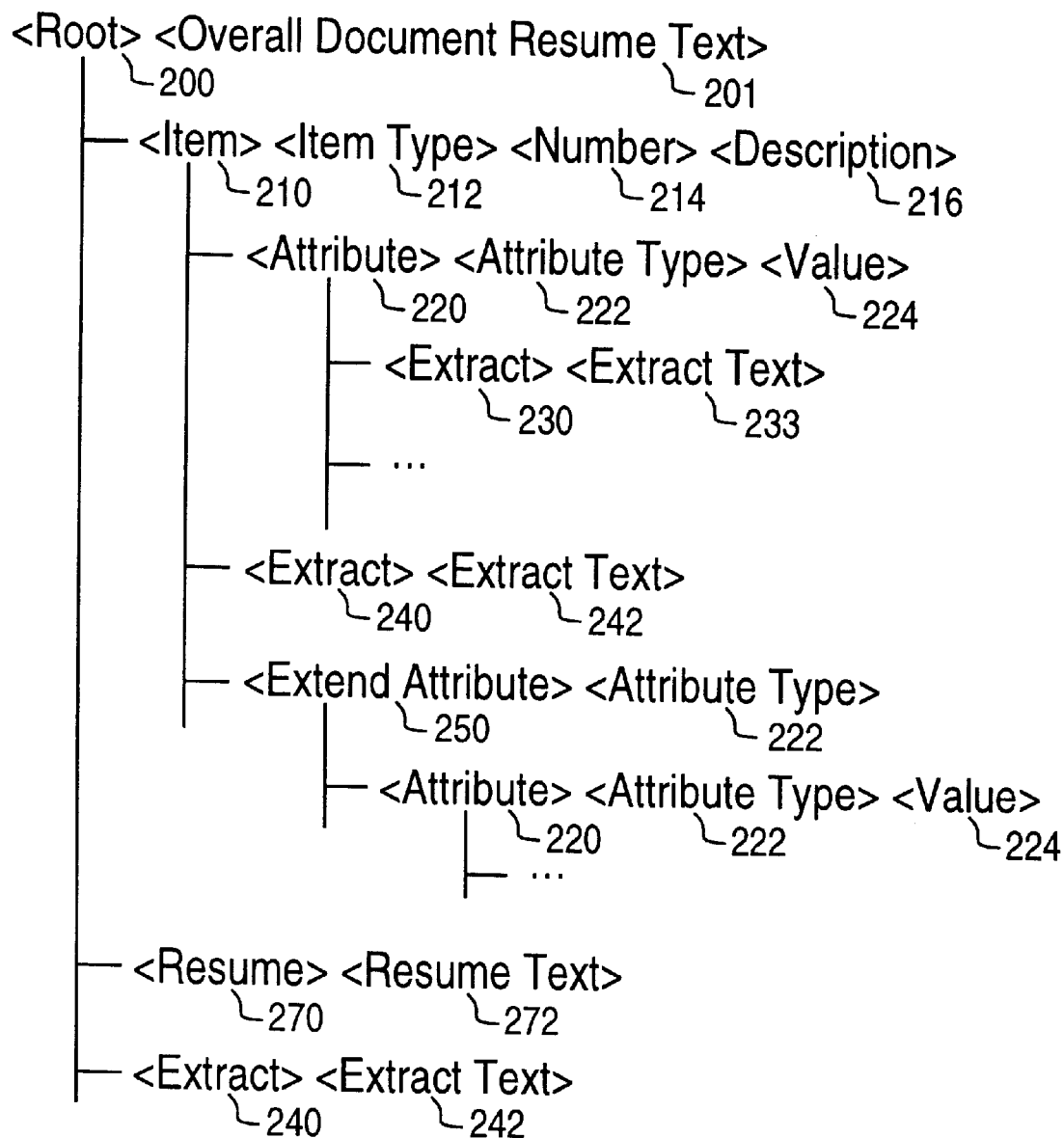
FIG. 2 is an illustration of the structure of the index plan database used in the preferred embodiment of the present invention.
Figure 3:
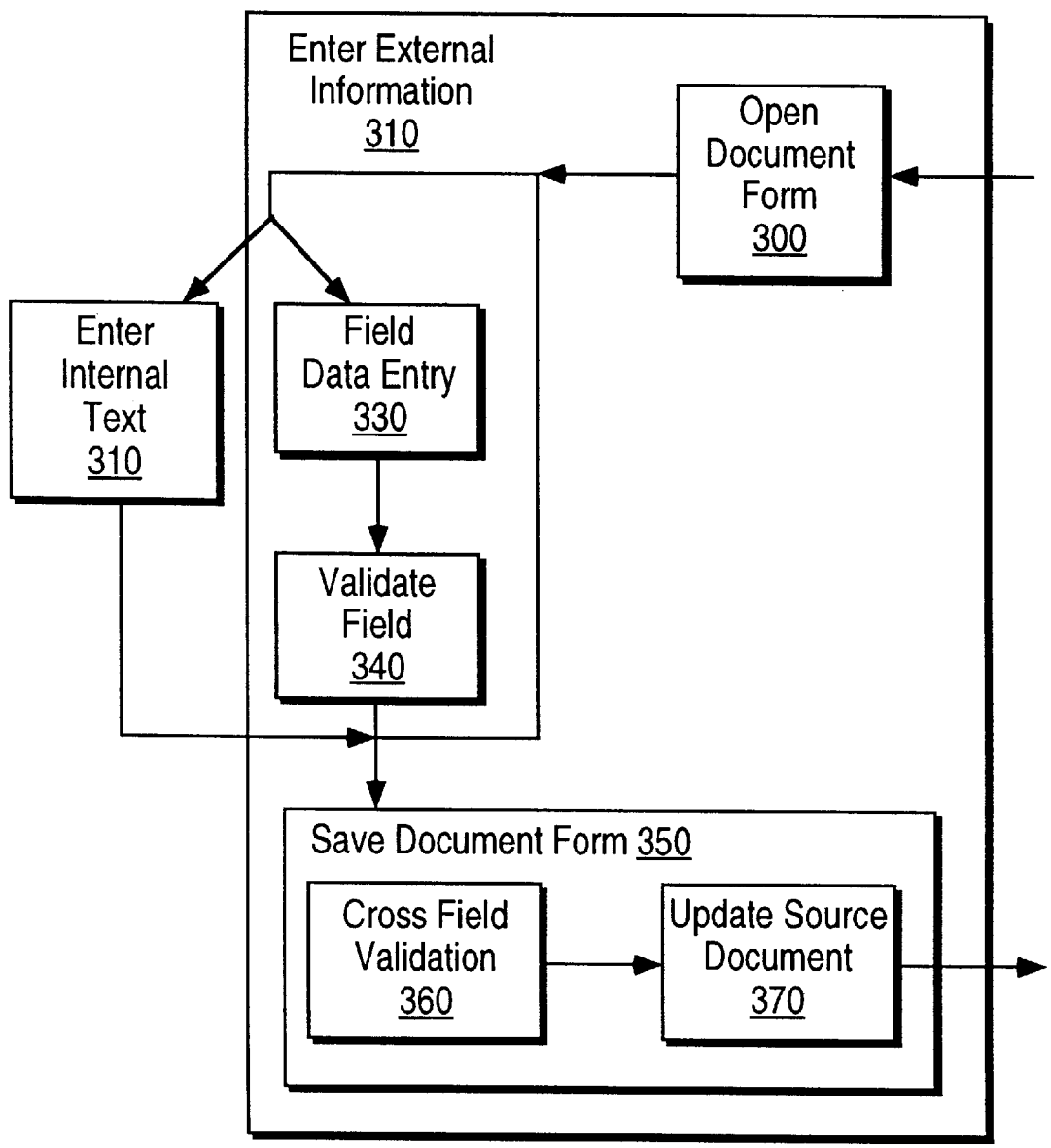
FIG. 3 is a flow diagram of the data entry process as used in the preferred embodiment of the present invention.

FIG. 2 illustrates of the structure of an index plan 104. The index plan 104 is made up of a plurality of nodes which are organized into a hierarchic data structure. There is a single root node 200 used to represent the electronic source document 100 itself. Each node in the index plan 104 has a distinct node type. In the preferred embodiment the node types are as follows:

| | |
|---|---|
| Item | An item 200 represents a proposed or unified, entity or link. A Proposed Item may either already exists in the structured entity relationship model 190, or else will need to be created. A Unified Item is a proposed item which has been unified with a specific Entity or Link in the structured entity relationship model 190 through Research. |
| Attribute | An attribute represents a proposed Attribute of an Entity or Link as extracted from the internal text or external |

-continued

| | information of the Source Document. |
|---|---|
| Extended Attribute | An extended attribute 250 is a proposed attribute which itself can have attributes. In the preferred embodiment, extended attribute 250 correspond to Detail Tables of entities in the structured entity relationship model 190. An entity may have any number of extended attributes of the same type. |
| Extract | An Extract 240 is a piece of text extracted from the internal text being indexed. |
| Resume | Provides a resume 270 of all or part of the internal text being indexed. The root node 200 represents a resume 270 of the entire electronic source document 100. |

In the preferred embodiment the properties of the nodes in the index plan 104 depend on the node type. The following table lists the properties of each node type as implemented in the preferred embodiment

TABLE 1

Properties of Node Types

| Node Type | Property | Comment |
|---|---|---|
| Item 210 | Item type 212 | String representing the intended type of entity or link |
| | Item number 214 | Number representing the item number 214. Can be either the internal node number for a proposed item, or the record number for a unified item. |
| | Item description 216 | Descriptive text |
| Extract 240 | Extract text 2242 | Extracted text |
| Attribute | Attribute type 222 | The name of an attribute of an entity or link, or a Phantom Attribute name. |
| | Attribute Value 224 | The attribute value in text form |
| Extended Attribute | Attribute type 222 | The type of attribute e.g. CLOTHING or ABNORMALITY |
| Resume 270 | Resume Text 272 | Extracted or free text |

Each node in the index plan 104 has a numeric identifier which is unique within the index plan 104. The numeric identifier does not change if the node is moved to a new location in the plan or if any other changes are made to the plan.

In the preferred embodiment an attribute type 222 can either be the name of an entity or link attribute as defined in the definitions server, or the name of a phantom attribute, which by convention has a name* suffixed by an asterisk. A phantom attribute can be used to communicate information between the steps of the indexing process and need not exist in the structured entity relationship model 190.

The index plan 104 for each source document is governed by a series of rules that requires an item node 210 and resume node 270 to have the root node 200 as its parent, the extended attribute 250 must have an item node as its parent, an attribute node 220 may have either an item node 210 or extended attribute node 250 as its parent, and an extract node 230 usually has an attribute node 220 as its parent, but it can have any node in the structure as its parent.

Nodes can also be addressed more efficiently via a node pointer. But unlike node ids, in the preferred mode node pointers do not remain constant when changes are made to the index plan 104. In the preferred embodiment functions are provided to translate between node ids and node pointers. Most functions access nodes via a node pointer for reasons of efficiency. Code that accesses an index plan 104 should not store node pointers—if a reference to a node needs to be stored, the node id should be held. When the node needs to be accessed the node id can be translated into a node pointer.

In the preferred embodiment, the initial framework of the information indexing system is initiated by a definitions server that implements the schema for the structured entity relationship model 190 and the initial structured entity relationship model 190 table. In addition the definitions server also initially defines the entity types, link types, together with their details field content. The definitions server is a user object in PowerBuilder that fulfills an information provision role in the preferred embodiment.

The following is a description of all the interfaces functions provided by the Definitions Server.

The comment/* By Ref */indicates parameters passed by reference.

Functions beginning with 'Get . . . ' return a single attribute as their return value. Functions beginning 'List . . . ' return a set of values in an array passed as a reference parameter—they have no return value.

Functions beginning 'Connect . . . ' return an object handle by reference. A call to a related 'Disconnect' function should be made when the handle is no longer needed.

The class hierarchy is a follows:

u_DefServer
   u_.Config
   u_ObjectDef
      u_VisualObjectDef
         u_FormDef
         u_PageDef
         u_PanelDef
      u_SchemaObjectDef
         u_CompositeObjectDef
         u_DomainObjectDef
         u_DbStructureDef
         u_DbAttributeDef
   u_ValidationRuleDef u_DefServer
boolean uf_ConnectFormDef (string as_FormName, u_FormDef auo_FormDef/* By Ref */)
   Returns the form definition object for the named form as a reference parameter. Return value is TRUE if ok, FALSE otherwise.
boolean uf_ConnectCompositeObjectDef(string as_CompositeObjectName, u_CompositeObjectDef auo_CompositeObjectDef/* By Ref */)
   Returns a composite object definition based on the name of the object. We should be able to use the same type of composite object definition for both composite and simple domain objects (since a simple domain object is just a degenerate case of the composite type)
none uf_DisconnectObjectDef(u_ObjectDef auo_ObjectDef/* By Ref ?*/)
   Disconnects an object definition from a particular customer of that definition.
u_Config
string uf_GetScreenResolution ( )
   Returns the screen resolution as either SVGA or VGA.
Boolean uf_ListForms (string as_FormList/*By Ref*/)
   Returns a list of available forms.
Boolean uf_ListFormByComposite (string as_CompositeName, datawindow adw_FormList)
   Inserts the list of available forms directly into the specified datawindow for the specified Composite. Returns TRUE if successful.
Boolean uf_ListFormByDomain (string as_DomainName, datawindow adw_FormList)
   Inserts the list of available forms directly into the specified datawindow for the specified Domain. Returns TRUE if successful.
Boolean uf_CanChooseForms (string as_CompositeType)

Returns TRUE if the user can choose the form for the specfied entity.

String uf_GetDefaultForm (string as_CompositeType)

Returns the id of the default form for the current user for the specified entity.

None uf_ListComposites (string as_CompositeNames [ ]/*By Ref */)

Returns a list of Composite objects available.

None uf_ListDomains (string as_DomainNames[ ]/*By Ref */)

Returns a list of Domain objects available.

None uf_ListDomainComposites (string as_DomainName, string as_CompositeNames[ ]/*By Ref */)

Returns a list of Composite objects available for the specified Domain.

String uf_GetCompositeDomain (string as_CompositeName)

Returns the primary Domain Object for the specified Composite.

None uf_ListCrossReferences (string as_HomeDomain, string as_AwayDomain, string as_CrossReferenceName, datawindow adw_Datawindow/* By Reference */)

Poulates the specified datawindow with a list of Cross-References. If any parameter is NULL it is considered to be a wildcard therefore if no parameters are filled in then all cross references are returned, if the home domain is filled in the function will return all the cross references for the specified domain.

String uf_GetDomainProbject (string as_DomainName)

Returns the Pb object (usually a datawindow) to display a list of entities for the specified Domain Object.

Boolean uf_LockParameterWithTrans (string as_Parameter, transaction at_Transaction)

Returns TRUE if the parameter specified is successfully locked using the transaction specfied.

String uf_GetParameterWithTrans (string as_Parameter, transaction at_Transaction)

Returns a string with the value for the parameter specified using the transaction specfied.

String uf_GetParameter (string as_Parameter)

Returns a string with the value for the parameter specified using a transaction from the defserver.

Boolean uf_SetParameterWithTrans (string as_Parameter, transaction at_Transaction)

Returns boolean if the value for the parameter specified using the transaction specfied was successfully updated.

String uf_GetSummaryString (string as_ObjecetName)

Returns a string with the summary string for the object name specified.

u_ObjectDef string uf_GetName ( )

Returns the name of the definition object. string uf_GetId ( )

Returns the id of the definition object.

string uf_GetAddress ( )

Returns the address of the object, in the form 'CompositeEntity:Entity.Structure.Attribute' or 'Form.SubForm.Panel'.

u_VisualObjectDef string u_GetPbObjectName ( )

Returns the name of the corresponding PowerBuilder object. This may be a window, child window, user object or datawindow.

string u_GetPbObjectType ( )

Returns the type of the PowerBuilder object.

u_FormDef none uf_ListPageDefs (u_PageDef auo_PageDefList[ ]/* By Ref */)

Returns a list (array) of the page definition objects for this form, in display order. The array is always reset to an empty array before being populated with the results. The array consists of references to existing objects, rather than freshly created objects.

There is no return value. If there are no sub forms, an empty array is returned.

The only memory allocated by this function is the additional elements added to the array passed in by reference. It is assumed these will be deallocated by PowerBuilder when the array goes out of scope.

integer uf_GetNoDisplayPages ( )

Returns the number of pages to be displayed.

integer uf_GetPageFixed ( )

Returns the number of the pages to be fixed, if any. No more than one page can be fixed at any time.

string uf_GetFixedPosition ( )

Returns the position of the page to be fixed. Value can be L (left) or R (right) string uf_GetCompositeObjectName ( )

Returns the name of the composite object for this form.

u_PageDef none uf_ListPanelDefs (u_PanelDef auo_PanelDefList/* By Ref*/)

Returns a list (array) of the panel definition objects for this form, in panel display order. Same comments apply as for other 'List' functions.

u_PanelDef integer uf_GetHeight( )

Returns the height of the panel in lines.

boolean uf_IsTwistable( )

Returns TRUE if the panel is twistable.

boolean uf_IsReadonly( )

Returns TRUE if the panel is readonly.

string uf_GetMinimisedPbObjectName( )

Returns the name of the datawindow to use when the panel is minimised.

boolean uf_IsConditional( )

Returns TRUE if the panel is only displayed after a certain condition is met.

boolean uf_TestCondition( )

Returns TRUE if the panel test condition returns TRUE string uf_GetSchemaAddress( )

Returns the schema address for the panel to be associated with.

u_SchemaObjectDef string uf_GetPrimaryKeyAddress( )

Returns the Attribute address for the unique ID of this object.

none uf_ListObjectValidationRules(u_ValidationRuleDef auo_ValidationRuleDef[ ]/* By Ref */)

Returns the set of validation rules which apply to the whole object.

integer uf_GetMaxRows( )

Returns the maximum number of rows which the object can contain integer uf_GetMinRows( )

Returns the minimum number of rows which the object can contain u_CompositeObjectDef none uf_ListDomainObjectDefs(u_DomainObjectDef auo_DomainObjectDefs[ ]/* By Ref */)

Returns the array of domain object definitions used by the composite object. Domain objects may be entities, links, research objects or any other kind. To handle this, the domain object class (and probably also the domain object definition class) will be subclassed to each of the required levels.

none uf_ListSaveOrder(string as_Attribute [ ]/* By Ref */)
Returns the order in which each of the DbStructures making up the object should be saved (and retrieved)
none uf_ListAttributeValidationRules(string as_AttributeAddress, u_ValidationRuleDef auo_ValidationRuleDef[ ]/* By Ref */)
Returns the set of validation rules which apply to the described attribute. This function may be available at each level of the object hierarchy, but providing different subsets of the rules.
none uf_Listjoins(string as_From[ ]/* By ref */, string as_To[ ]/* By ref */)
Returns the set of join rules which apply to the composite object.
u_DomainObjectDef
none uf_ListDbStructureDefs(u_DbStructureDef auo_DbStructureDefs[ ]/* By Ref */)
Returns the array of database structure definitions used by the object. A structure in this sense maps onto a database table.
none uf_ListClassValues(string as_ClassColumn[ ]/* By Ref */, string as_ClassValue[ ]/* By Ref */)
Returns the array of attributes and their corresponding values for those attributes that have specific values for the sub class of domain object concerned
boolean uf_IsReadOnly( )
Returns True if the domain object is just a reference to an already existing object (i.e. the user can't edit the object within this composite)
none uf_ListCompletionFunctions(string as_FunctionName[ ]/* By Ref */)
Returns an array of function names that should be called in order to complete the saving of a domain object
none uf_ListCompletionAttributeAddresses(string as_FunctionName, string as_attributeAddress[ ]/* By Ref */)
Returns an array of attribute addresses for the function specified
u_DbStructureDef
none uf_GetDbAttributeDef(u_DbAttributeDef auo_DbAttributeDef/* By Ref */, integer ai_DbAttributeDefCount/* By Ref */)
Returns the attribute definition object handle and the number of attribute definitons held in its array. A structure in this sense maps onto a database table.
string uf_GetTableName( )
Returns the name of the database table associated with the DbStructure.
string uf_GetDataWindowName( )
Returns the name of the datawindow used to hold the attribute values for the object
String uf_GetForeignKeyAddress( )
Return the address of the foreign column
none uf_IsReadOnly( )
Returns True if the dbstructure object is just a reference to an already existing object (i.e. the user can't edit the object within this composite)
u_DbAttributeDef
string uf_GetAttributeName (integer ai_AttributeNumber)
Returns the name of the definition object.
string uf_GetAttributeId (integer ai_AttributeNumber)
Returns the id of the definition object.
string uf_GetAttributeAddress(integer ai_AttributeNumber)
Returns the address of the object, in the form 'CompositeEntity:Entity.Structure.Attribute' or 'Form.SubForm.Panel'.

string uf_GetDbObjectName(integer ai_AttributeNumber)
Returns the name of the column associated with the DbAttribute.
string uf_GetDataType(integer ai_AttributeNumber)
Returns the data type of the attribute.
string uf_GetKey(integer ai_AttributeNumber)
Returns the type of key for the attribute (PRIMARY, FOREIGN, LOOKUP)
string uf_GetReferenceTable(integer ai_AttributeNumber)
Returns the reference table for the attribute if the key is FOREIGN or LOOKUP The index plan 104 is based on a generalised outline control. The generalised outline control may be used to build other types of outline control for use within the application.

The inheritance hierarchy is:

```
u_Outline
    u_IndexPlan
    u_AnotherTypeofOutline
```

The base class u_Outline provides the basic outline navigation and manipulation functions.

All the functions specific to an index plan 104, such as those for accessing index plan 104 specific node properties are provided by the derived class u_IndexPlan.

The index plan 104 interface functions, as defined below, include mechanisms for examining the current content of the index plan 104, adding new Proposed Items, Attributes and their values, and modifying existing ones.

function long uf_Walk (long al_NodePtr, string as_Direction, ref string as_NewNodeType)
Walks the plan.
Returns a node pointer depending on the direction parameter as follows:
CHILD—the first child of this node.
PARENT—the parent of this node.
NEXT—the next node at the same level i.e. the next sibling.
PREVIOUS—the previous node at the same level i.e. the previous sibling.
Returns a pointer to the new node or −1 if there is no such node. If a new node is returned, the parameter as_NewNodeType is set to the node type
The root of the plan has a node pointer of 1.
The order in which nodes are returned is not affected by the expanding or collapsing of different branches for display purposes.
function boolean DeleteNode (long al_NodePtr )
Deletes a node and any children.
Returns TRUE if successful, FALSE otherwise.
To delete the entire plan, pass a node pointer of zero.
function long uf_AddItem (long al_NodePtr, string as_RelativePosition, string as_ItemType, ref string as_ItemNumber, string as_ItemDescription)
Adds a new item node at a position relative to the specified node. The relative position can be as follows:
CHILD—the new node is a child of the specified node.
NEXT—the new node is made the next sibling of the specified node, i.e. the next node at the same level.
PREVIOUS—the new node is made the previous sibling of the specified node, i.e. the previous node at the same level.
Returns a pointer to the new node or −1 if there was an error.

If the parameter as_ItemNumber is empty ( ) then the new node will be allocated a new item number 214 (eg N#2 or A#5). The allocated item number 214 will be returned in as_ItemNumber.

If the parameter as_ItemNumber contains a value this will be used as the item number 214 for the new node.

function long uf_AddExtract 230 (long al_NodePtr, string as_RelativePosition, string as_Extract)

Adds a new Extract 230 node at a position relative to the specified node position.

Operates like uf_AddItem.

function long uf_AddAttrib (long al_NodePtr, string as_RelativePosition, string as_AttribType, string as_AttribValue)

Adds a new Attribute node at a position relative to the specified node position.

Operates like uf_AddItem.

function long uf_AddExAttrib (long al_NodePtr, string as_RelativePosition, string as_AttribType)

Adds a new Attribute node at a position relative to the specified node position.

Operates like uf_AddItem.

function long uf_AddResume 270 (long al_NodePtr, string as_RelativePosition, string as_Text )

Adds a new Resume 270 node at a position relative to the specified node position.

Operates like uf_AddItem.

function boolean uf_CutNode (long al_NodePtr)

Removes the specified node and all its children from the plan and stores them in a temporary clipboard area.

Returns TRUE if successful, FALSE otherwise.

Note—the clipboard can not hold multiple cut commands.

function boolean uf_CopyNode (long al_NodePtr)

Copies the specified node and all its children from the plan and stores them in a temporary clipboard area.

Returns TRUE if successful, FALSE otherwise.

Note—the clipboard can not hold multiple copy commands.

function boolean uf CanPaste ( )

This functions return TRUE if there is data in the clipboard and FALSE if there is not.

Used as a test before you paste.

function long uf_PasteNode(long al_NodePtr, string as_RelativePosition)

Pastes the node(s) held in the clipboard into the plan at a position relative to the specified node. The relative position can be as follows:

CHILD—the new node is a child of the specified node.

NEXT—the new node is made the next sibling of the specified node, i.e. the next node at the same level.

PREVIOUS—the new node is made the previous sibling of the specified node, i.e. the previous node at the same level.

Returns the position of the pasted node or −1 if failed.

When pasting a node, the node retains its original id, unless this would duplicate an existing id. For example, if a node is cut from one position and pasted to a new position in the plan it will keep the same id. If a node is copied and pasted into a new position, the new node will be allocated a new id.

Node Id and Node Pointer Functions function long uf_GetNodeld(long al NodePtr)

Given a node pointer returns the unique node id for this node.

function long uf_GetNodePtr(long al_NodeId)

Given a unique node id returns the node pointer.

Get and Set Functions

The properties of a node are accessed via functions-there is one set of functions to get properties and another to set properties.

Once the requirements for node status information become clear, new functions will be added for getting and setting the status of a node.

The table below lists the get and set functions. The prototype of each get function has the form:

function string uf_GetPropertyName(long al_NodePtr)

The return value is the requested property in string form. Each set function has a prototype of the form:

function boolean uf_SetPropertyName (long al_NodePtr, string as_Value)

The return value is TRUE if successful, otherwise FALSE.

| Node Type | Property | Functions |
| --- | --- | --- |
| All Nodes | Type (read only) | uf_GetType |
| ITEM | Item number 214 | uf_GetItemNumber |
| | | uf_SetItemNumber |
| | Item Type | uf_GetItemType |
| | | uf_SetItemType |
| | Item description 216 | uf_GetItemDescription |
| | | uf_SetItemDescription |
| EXTRACT | Extract 230text 233 | uf_GetExtractText |
| | | uf_SetExtractText |
| ATTRIB | Attribute type 222 | uf_GetAttribType |
| | | uf_SetAttribType |
| | Attribute Value | uf_GetAttribValue |
| | | uf_SetAttribValue |
| EXATTRIB | Attribute type 222 | uf_GetAttribType |
| | | uf_SetAttribType |
| RESUME 270 | Resume 270 Text | uf_GetResume 270Text |
| | | uf_SetResume 270Text |

Display Functions boolean uf_SetCurrentNode (long al_NodePtr )

Makes the specified node the current node. The node is highlighted to show that it has focus. If necessary the plan is unfolded and/or scrolled to display this row.

long uf_GetCurrentNode ( )

Returns the position of the current node (the node that has focus).

DATA ENTRY

The data entry step 120, which involves taking the entire manuscript source document 110 and initially placing it into the electronic source document 100, is accomplished through the use of a set of document forms 300 as defined by the definitions server. For each source document type there is a related document form 300 which provides both the visualization of the electronic source document, and also the means by which data is entered into the database record or edited thereafter. In the preferred embodiment, the documents forms use the full range of input controls of PowerBuilder™ plus a specific text control for the internal text as defined above. The standard library of controls provided by PowerBuilder™ ensure conformance to established User Interface Guidelines for the Windows™ Environment. For example, a drop down list can be employed for enumerated datatypes, a check box can be employed for booleans, radio buttons can be employed for mutually exclusive values, and so on. The text control is based on HighEdit supplied by Heiler, and provides standard word processing capabilities, such as word wrap, sufficient for document text entry. Each field of the database record can have a corresponding field data entry control function 330 in the document form to suit the type of value that is permitted in the database record field.

In the preferred embodiment data entry 120 proceeds by the user tabbing from field to field in the Document Form. In each field data entry 330 the user is permitted to either type a value, or select a value, according to the type of PowerBuilder control used in the document form design. For example some fields will permit the user to type a value, whilst others will require the user to select from an enumerated list, whilst others still might require the checking of a check box, and so on. Each PowerBuilder control supports some checking or validation 340. For example, if the field is defined to be numeric then only digits will be accepted as typed input. In addition, validation rules obtained from the definition server are applied. These apply domain restrictions which cannot be simply incorporated into the defined datatypes. For example a person's age cannot be less than zero, or greater than 150. Some fields have enumerated values. In such a case the user can only select from one of these values, which are held in a field lookup table in the definitions server. Additional cross field validation is also performed when the document form as a whole is saved. For example, the Nominal age is stored as two values representing a range of values. The AgeFrom value must be less than or equal to the AgeTo value.

In addition the document form has built in knowledge of what external information of the source document 310 needs to end up in the structured entity relationship model 190. Upon completion of data entry 120 into the electronic source document 100 this information is transferred into the index plan 104 in preparation for later stages of the indexing process. Accordingly, transfer of the external information 102 into the index plan 104 is always prepared in the context of a document form.

EXTERNAL INFORMATION EXTRACTION

Figure 4:
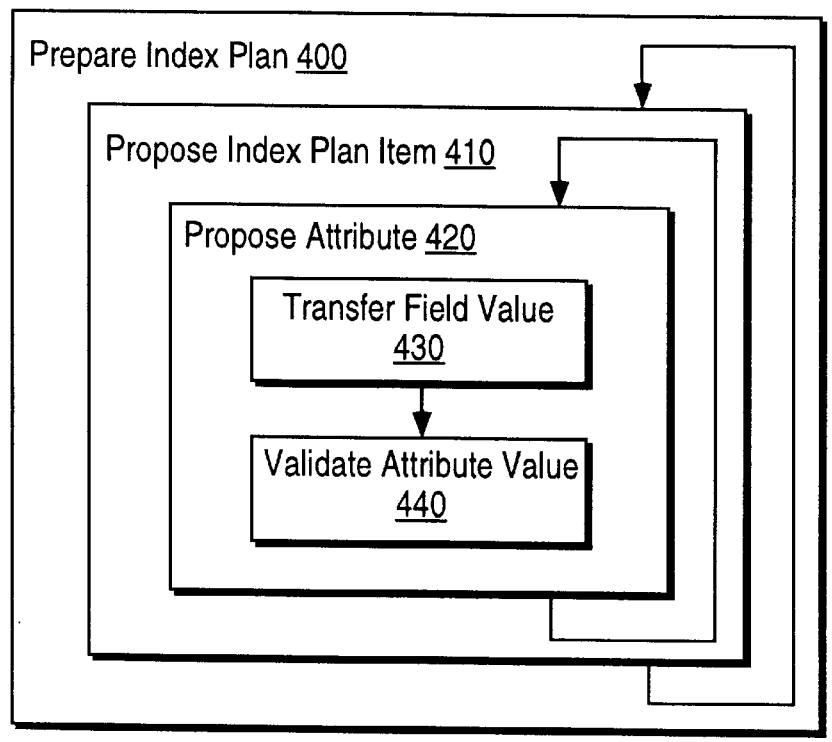
FIG. 4 is a flow diagram of the external information extraction step as used in the preferred embodiment of the present invention.

This external information extraction process, as represented at FIG. 4, is performed using the standard index plan 104 Interface Functions as described in microfiche Appendix A. The intended destination of each attribute of each source document is listed in the MASTER.XLS spreadsheet listed in microfiche Appendix A. In transfer the external information 102 into the index plan 104, the Document Form uses a pre-defined list of index plan items based on the destination information as defined in the document form spreadsheet and listed in the Destined For column in the MASTER.XLS spreadsheet. For each index plan item that it prepares 400, the preferred embodiment also call upon a predefined list of attributes 420 that it can prepare from the electronic source document 100. These attribute values for the proposed index plan item 410 take on the values stored in the source document record fields.

For example, a Witness Statement Document will carry external information on the Author's Surname, First Names, Date of Birth, Occupation, Home Address and other information. A Nominal (person) Node and Location (address) Node would thus be prepared as proposed items in the index plan 400. Individual attributes nodes would be prepared for Surname, Forename1, Forename2, Date of Birth and Occupation, under the Nominal Node, and similarly, Street Number, Street Name and District attributes would be prepared under the Location Node.

INTERNAL TEXT EXTRACTION PROCESS

Figure 5:
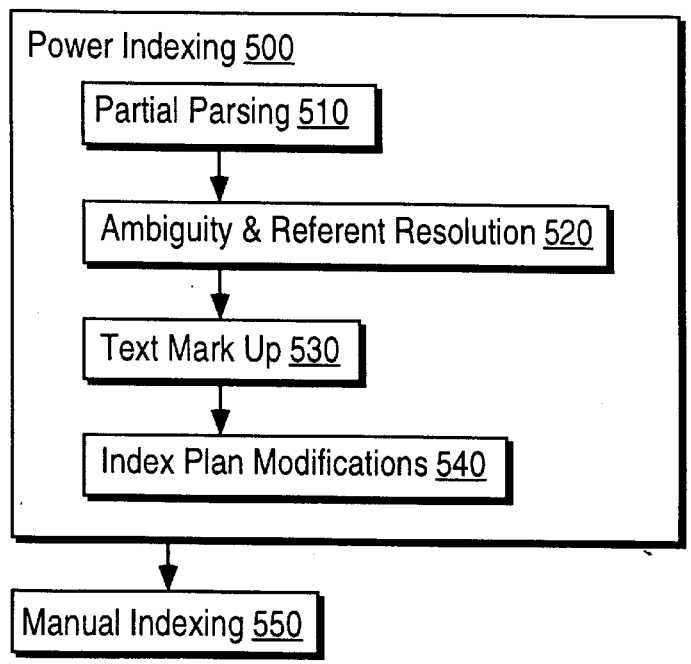
FIG. 5 is a flow diagram of the internal information extraction step as used in the preferred embodiment of the present invention.

The internal text extraction process 140, shown in FIG. 5, commences with the recognition and marking up of words and phrases in the internal text which indicates the required existence of an entity or link, and its attribute value, in the structured entity relationship model 190. In the preferred embodiment no entity, link or attribute value is ever directly added to the structured entity relationship model. Instead the index plan 104 is used to collate and organise proposed entities, links and attribute values, before they are researched in a later sub-process.

AUTOMATED INTERNAL TEXT EXTRACTION

The automated from of Internal Text Extraction, or the powerindexing process in the preferred embodiment works by first partially parsing the Internal Text, sentence by sentence, and then building up, or adding to, the index plan from those words and phrases recognized by the partial parsing. The labeling employed in partial parsing is used to indicate what should be built in the index plan.

In the preferred embodiment, partial parsing is based on established parsing techniques from the fields of Natural Language Processing and Computer Language Parsing. The preferred embodiment uses chart parsing. The invention uses only one interpretation of any substring of words, though chart parsing can often produce multiple interpretations. Ambiguity in the extracted text is resolved by using one or more of the following rules: (1) analyses that span more words are preferred over those that span fewer and (2) analyses that produce in their parse output bigger single units are preferred over those producing smaller units. In competing analyses of substrings of the same length, analyses that have fewer lexical entries are preferred. Standard techniques are augmented with specific extensions required for internal text extraction.

The powerindexing process takes as input a set of Grammar Rules, and Word Lists. The Grammar Rules are written in a specifically designed grammar language specification described below, The Grammar rules in the prefered embodiment are attached at microfiche Appendix A:

1. Tokens

These rules are followed in the order listed to divide the text of the grammar file into tokens.

Two slashes (//) is the comment indicator. The rest of the line is treated as a comment.

A double quote (") begins a quoted string of literal text, which must be closed with a matching double quote before the end of the line. Double quotes can be included within strings by preceding them with a backslash, which is also how backslashes themselves can be included within strings. So the string |the\"end"| would be written as "|the\\\"end\"|". The comment indicator (//) can be included in a string by "\\".

An alphanumeric token is defined as an alphanumeric character followed by any number of alphanumeric characters and/or the hyphen (–) and underscore ($_{31}$) characters. Once an alphanumeric token is recognized, it is classified. If it is one of a set of reserved keywords, it is recognized as that keyword. Otherwise it is recognized as:

NUMBER if it is nothing put digits

VARNAME if it has at least one lowercase character or digit in it.

error if it is composed entirely of uppercase characters, hyphens, and underscores. Keywords are always composed of just these characters, so this is a feature to uncover mistakes in keywords.

Whitespace characters are ignored, except inside of quoted strings (above) or for determining alphanumeric token boundaries.

Other characters (in practice this means punctuation) are treated as separate tokens.

2. Rule boundaries

Lines consisting of nothing but whitespace and/or comments are ignored.

Otherwise the grammar file is taken to consist of grammar rules.

If a line ends with a plus sign (+), it is assumed that the rule continues on another line; otherwise the rule is assumed to end on that line. This means that complex rules can be written with one righthand side term per line as long as the '+' is at the end of the line.

3. High-level grammar rule syntax

This is the structure of a grammar rule:
  a. An optional series of rule attributes
  b. A mandatory colon (:)
  c. An optional lefthand side term
  d. A mandatory equal sign (=)
  e. One mandatory right-hand side term
  f. Any number of optional right-hand side terms, each preceded by a plus sign (+)

4. Rule attributes

All rule attributes begin with a reserved keyword. Most consist only of the keyword, while some must be followed by an argument.

SET—This must be followed by a VARNAME which identifies a set of rules to which this rule belongs. The user may elect to suppress certain rules, and if the user has specified any of the set names associated with a rule, the rule is simply not used during sentence processing.

TOKEN—This is a token rule. The rule classifies a token of the English input by looking at the token's characters. Other rules apply to one or more tokens and do not look at characters. Token rules differ substantially from other rules in their allowable semantics. None of the attributes below are allowed together with TOKEN.

EXTENDLTOCAPSEQ—A capitalized sequence is defined precisely elsewhere. It is approximately a series of sequential capitalized words. This attribute indicates that the rule applies only if the text it spans is a subset of (or identical to) a capitalized sequence. When it does apply, the lefthand-side label applies not just to the input text, but is extended left to the edge of the enclosing capitalized sequence. If the input text starts at the capitalized sequence's left edge already, the rule applies but no extension is performed.

EXTENDRTOCAPSEQ—Like EXTENDLTOCAPSEQ but extends to the right edge instead of the left edge.

CAPSEQ—The rule only applies if the span of the rule (first extended by EXTENDLTOCAPSEQ and/or EXTENDRTOCAPSEQ if specified) is in fact precisely the extent of the entire capitalized sequence.

STRING—When constructing index plan output from this rule, ignore any internal structure and treat all the text the rule spans as a single text string.

PERSONL—This must be followed by a number. This is required for link rules and attribute rules and forbidden for LHS rules (the rule type are defined below under "Lefthand side". The link or attribute will be made to the last-mentioned person if it ended within the specified number of words of the beginning of the constituent. Otherwise, the link or attribute will be made to an unknown person. For instance, "I am a farmer" would link "farmer" to "I" with "PERSONL 3" but not with "PERSONL 2". If we later introduce last-known cars or other items, a corresponding keyword will be created.

BONUS—This must be followed by a number, the number of bonus points to give to an analysis using this rule, as against a default of zero. At the moment this is just used to disambiguate between two interpretations for the very same substring, but it might be extended later and its semantics made more complex.

PENALTY—Like BONUS, but the number of penalty points to assign compared to a default of 0.

NOBLANKLINKS—This is valid only for attribute or link rules. It means that no link should be generated if the last person is not valid, and that no nominal should be created specially to hold the attribute. Without this keyword a link will be generated with a missing "home" specification, and a nominal will be created to hold the attribute.

LASTRESORT—This marks the rule as something to be tried only if other normal grammar rules have not successfully classified the text. It is applied in a separate pass after normal parsing is complete and is only tried for text that does not overlap with previously-parsed text. It is used for capitalized phrases and capitalized words at present.

NOTPOSSPRONOUN—This applies to link or attribute rules and means that the link or attribution should not be made if the last person was identified by a possessive pronoun (my, your, his, etc.). To date it is used only to allow the attribution of an occupation to the speaker for "I am a doctor" but prevent it for "my doctor".

5. Lefthand side

TOKEN rules must have a lefthand side which is a single VARNAME without any modifiers. The rest of this section applies to non-TOKEN rules:

A standard grammar rule of the form $$A=B+C$$

says that if you see a B followed immediately by a C anywhere in a sentence, the concatenation of the two things should also be known as an A.

In the present grammar specification, a lefthand side is optional. Rules of this form are still useful because the right side specifies side effects.

If present, a lefthand side always begins with a VARNAME. It may be followed by either or both of the following, though if both are present they must be in the order given:

Pound character (#). This specifies that this item by itself should not be the root of an index plan item. Only if it is in turn on the right side of some other grammar rule should it be considered. This is useful for building the internal structure of items which may not be valid unless some other key element is present.

IPSpec (index plan specification). In this context, the IPSpec is restricted to a VARNAME within square brackets. This means that the index plan output should be labelled with the term in brackets instead of the preceding varname. This is useful for the case where we have identified for instance a mother. In index plan terms it should be a nominal (so the IPSpec is "[nominal]"), but we also want to use its specific identity as a mother to create a mother-link to a previous nominal, so we keep its run-time, parsing name as "mother".

Non-TOKEN rules are divided into three classes based on their lefthand sides:

A link rule is one without a lefthand side. It is used to create a link between some term(s) on the righthand side and the last known person.

An attribute rule is one with the special VARNAME "last-person" as the lefthand side. It is used to add field attributes to the last known person.

A LHS rule is one with some other lefthand side VARNAME. It is used to create a bigger unit from smaller units and is the traditional phrase-structure grammar rule.

A special case of an LHS rule is one with the special symbol "suppress" as its lefthand side. This means to recognize this construction but suppress the inclusion of it (or any overlapping analysis) in the index plan.

6. Righthand side terms for non-TOKEN rules

Righthand side terms for TOKEN rules are discussed in a separate section below. For non-TOKEN rules, the two basic types are as follows:

Quoted string. For the rule to apply, the material within quotes must appear in the input text. The match is case-insensitive, so that "cat" in the text would match "CAT" in the rule or vice versa. Text that has several words (or more precisely, translates to several tokens) can appear in a single quoted string and is divided into tokens when the grammar rule is compiled.

VARNAME. A category name. The same name space covers lexical categories, the output of a TOKEN rule, or the output of another non-TOKEN rule.

The VARNAME may be followed immediately by a pound character (#) to indicate that this item should be suppressed when generating index plan output. This is useful for getting rid of intermediate nodes that are useful for building and classifying items but have no role in an index plan.

Either of these types (quoted string, and VARNAME, possibly with #) can be followed by one or more of the following modifiers, though if more than one is present they must be in the order given:

Caret (^) character. This indicates that the sentence text must not begin with a lowercase letter, and is used for instance to prevent "bob" from being recognized as a forename in "the corks bob in the water". When the text spans several words, it is the first word that must not start with a lowercase letter.

VSTEM keyword. This allows a match if the sentence text is an inflected verb form of the rule or list text. The standard inflected forms are the verb endings -s, -ed, and -ing, though irregular verb forms are also handled. This only works properly when what is compared is a single token. An error is generated when STEM is applied to a quoted string of more than one token, though this checking is not practical for list lookups.

NSTEM keyword. This allows a match if the sentence text is a plural noun ending in -s. Irregular noun forms are not handled.

NOGENDER keyword. Ordinarily a nominal is scanned for terms which give a clue as to its gender. NOGENDER after a term indicates that this term should NOT be scanned. It is to handle cases like "the brother of Jayne SMITH". This whole phrase is recognized as a single nominal to be linked as "brother" to the last mentioned person, but "brother" is marked NOGENDER to avoid its interfering with determining the gender of the actual nominal Jayne SMITH.

IPSpec (index plan specification). The IPSpec is enclosed in square brackets. First comes an optional number, then a required VARNAME.

(a) If the number is not present, the VARNAME is what this node should be labelled in the index plan. This is only allowed for LHS and attribute rules. For instance in the LHS rule:

: nee#="nee"+surname[maiden-name} we recognize a surname according to all rules for recognition of any surname, but when it occurs after "nee" we wish to relabel it a maiden-name in the index plan. [Note that as of 4/96 maiden names are not actually handled this way, but the example still illustrates the principle.]

In the attrib rule:

PERSONL 8: last-person=shade+hairalone[hair]

we assign index plan items associated with righthand side terms as children of the last person (not the special symbol "last-person"). "shade" is transferred to the last person under the attribute name "shade". "hairalone" is relabelled as "hair". Righthand terms that are constant text or labelled with the pound (#) key are not copied at all.

(b) If the number is present, this is a linking specification. This is only allowed for link rules. 0 applies to the last known person. Other numbers are designed to apply to terms of the righthand side of the rule (e.g. 1 for the first term, 2 for the second, etc.) but there has been no need to implemented this so far. The VARNAME is the label to be used on the link.

7. Righthand side terms for TOKEN rules

Remember that TOKEN rules operate on a single token, categorizing it by looking at its characters. The options are:

Quoted string. The character in this position must be one of the characters in the quoted string. This comparison is case-sensitive. Note that in this case the quoted string is a series of options for matching a single character, as opposed to the sequential match of a series of characters for quoted strings in non-TOKEN rules.

A character-classification reserved keyword. These are:

DIGIT        Matches 0–9.
LETTER       Matches a–z and A–Z
LOWERCASE    Matches a–z
UPPERCASE    Matches A–Z
ALPHANUM     Matches 0–9, a–z, and A–Z
NOTABLE_UPPERCASE   This is only true for the first character of the token, when it is uppercase and in a significant position, excluding for instance the first word of a sentence or the first word after an open quotation mark.
NOTABLE_ALLCAP   This is only true of the first character of the token, when it is uppercase and in a significant position, excluding for instance the first word of a sentence or the first word after an open quotation mark if the sentence or quotation consists solely of words in all uppercase.

Either the quoted string or the keyword may be followed optionally by a count specification in curly braces. It has one of the following forms:

{m} Exactly m are required

{m-} A minimum of m are required with no maximum

{m-n} A minimum of m and maximum of n are required

Without a count specification a single instance is required. Note that a space is required before the hyphen so the tokenizer considers it a separate token rather than part of the preceding number.

TOKEN rules operate by evaluating terms from right to left, each term consuming as many characters as its count specification allows before proceeding to the next term.

The Grammar Rules are used, as in other parsing applications, to instruct the Partial Parser how to label the words and phrases recognized from the input sentence. These labels are, in turn, used to determine the proposed entities, links and attributes to be added or changed in the index plan. In this sense the choice of label names in the Grammar Rules is governed by the names of entities, links and attributes in the structured entity-relationship model. Specifically the labels determine the entity, link or attribute names to be built in the index plan. The actual words or phrases recognized are placed as extracts below the attribute nodes built. Where a value can also be validated under the attribute value validation rules described below these values are also placed as the attribute value on the attribute nodes. Where an entity, link or attribute is already present in the index plan for the words or phrase recognized, the entity, link or attributes can be re-used with additional extracts being added below attribute nodes without affecting the attribute value.

Where the powerindexing process can recognize some Words or Phrases in the internal text which have no obvious place in the structured entity relationship model, it may still pass information on to other steps of the process through the index plan. Where the entity or link can be determined, but no appropriate attribute can be determined, the powerindexing process can create Phantom attributes together with attached values and extracts. A Phantom attribute is the same as any other attribute, but is specifically not recognized in the target structured entity relationship model. The Phantom attribute can however provide valuable information for other sub-processes. To illustrate this point, in the preferred embodiment, the target structure entity relationship model has an Event entity, with DateFrom and DateTo fields. In certain examples of internal text extraction the powerindexing process will only be able to recognize the year of an event. With only the year information the information extracted it is not able to construct a validated Date value to pass through as a value to the DateFrom attribute. Nevertheless the Year information is valuable and can be exploited later in the process. In the preferred embodiment therefore powerindexing process creates a FirstYear* phantom attribute, which then is used in the later editing of the Event to construct a range of dates from the 1st January to the 31 st December of that year. Thus DateFrom would ultimately get set to 01/01/<Year> and DateTo to 31/12/<Year>.

In cases where powerindexing process is unable to determine either an entity or link, or a specific attribute, then it can place an extract in the index plan . In the preferred embodiment in the User Review and Editing sub-process the user is able to use the PlaceAs command to place that extract as a specific attribute of a specific Entity or Link.

TEXT MARK-UP

An additional feature of the preferred embodiment is the Mark-Up of the actual text in the internal text during the powerindexing or manual indexing process. This Mark-Up process forms a hyperlink between the extract node in the index plan and the marked text.

In its Partial Parsing, the powerindexing process records the character positions of the start and end points of each text extract that it recognizes. In the preferred embodiment this the character offset at the beginning and end of the text in the internal text table within the electronic source document 100. The index plan Interface Function for adding a text extract, uf_AddExtract, takes these two offsets as parameters in addition to the extracted text, and creates the text extract node with an internal Node ID, a number, to mark up the internal text. In the preferred embodiment the Node ID number, represented between two vertical bar brackets, is inserted immediately after the recognized text. Attributes for superscripting and using a distinguishing color are set on these characters, both for their visual appearance and also to guarantee later recognition of marks on the text. This particular attribution of characters in the internal text, is the means used to distinguish a mark from other forms of text, in the preferred embodiment.

Thus from the node ID on both the mark in the text and on the node in the index plan the preferred embodiment has sufficient information for the user interface to support hyperlinking between the two, and in particular convenient navigation from one to the other. That is selecting the mark in the internal text, will cause the index plan to scroll to the hyperlinked extract node, and vice versa.

ATTRIBUTE VALUE VALIDATION

In the preferred embodiment, the mechanisms for preparing attribute nodes in the index plan 104 obey certain attribute validation criteria and attribute validation rules which protect the integrity of data and also later parts of the indexing process. The attribute validation criteria only permits valid entities and links to be placed in the index plan 104, that is those known to the target database schema as listed in Appendix A under Similarly, the attribute validation criteria will place only known attributes of entities and links in the index plan 104. If no valid value can be determined , such as a partial date information, such as the year only, where a complete date would otherwise be required for a fully validated value, then one of two approaches can be adopted. A null value is placed on the attribute node and an extract node can be created immediately below the attribute node, the extract node being the carrier of the value through rest of the process.

Alternatively, a phantom attribute node tagged as to the target database can be created. In the preferred embodiment the default option is to use the extract node method. However, in the automated indexing process, or powerindexing process described below, the latter is the default mode.

In the preferred embodiment attributes should always be validated according to attribute validation rules as specified in Definitions Server. The rules require the attribute to be of the required type, and if an enumerated type it needs to be one of the allowable values. Phantom attributes are also validates but in a less formal way because they are only shared between sub-processes of the information indexing process and are not used directly for communication with the main structured entity relationship model 190 as the rules do not come from the defintions of the structured entity relationship model 190, but rather from a set of conventions by communicating pairs of sub-processes. In such circumstances it is the responsibility of the sub-process creating the phantom attribute to ensure that only acceptable values are placed on the index plan 104. The receiving sub-process should also check the values that it receives.

In summary attributes known to the structured entity relation model are validated according to the rules of that model, thus ensuring the integrity of the resulting database. Phantom attributes are policed only by the sub processes that make use of them.

USER REVIEW AND EDIT

An additional features of the preferred embodiment also permit the user to review and edit the index plan as generated by powerindexing process, or to build an index plan manually. When used in this manner the user has ultimate control over what is indexed from a source document.

This user interface is based upon the index plan Interface Functions described above. The user review, edit and indexing processes work on the assumption that the external information extraction 130 has already occurred and more specifically that a root node has been created, together with a number of proposed item nodes and attribute nodes.

In the preferred embodiment, the user interface comprises of the following functions:

Add Item, which adds an item to the index plan including its attributes values.

Edit Item, including adding or editing attributes and their values.

Merge Items, where the attributes and values of one proposed item are merged into another.

Extract As, where a word or phrase is selected in the Internal Text, copied to form an Extract Node, and placed under either some existing or new attribute of a proposed item. The selected text in the internal text is underlined and the index plan Extract node number inserted immediately after the selected text. This is used to perform the hyperlinking between an extract node in the index plan and underlined/marked text in the internal text.

Place As, where an Extract Node can be repositioned in the index plan under a different or new attribute node.

Delete, where any node in the index plan can be deleted.

These functions give the user the facilities to do manually what powerindexing process does automatically, and also to edit the index plan as generated by powerindexing process.

Figure 7:
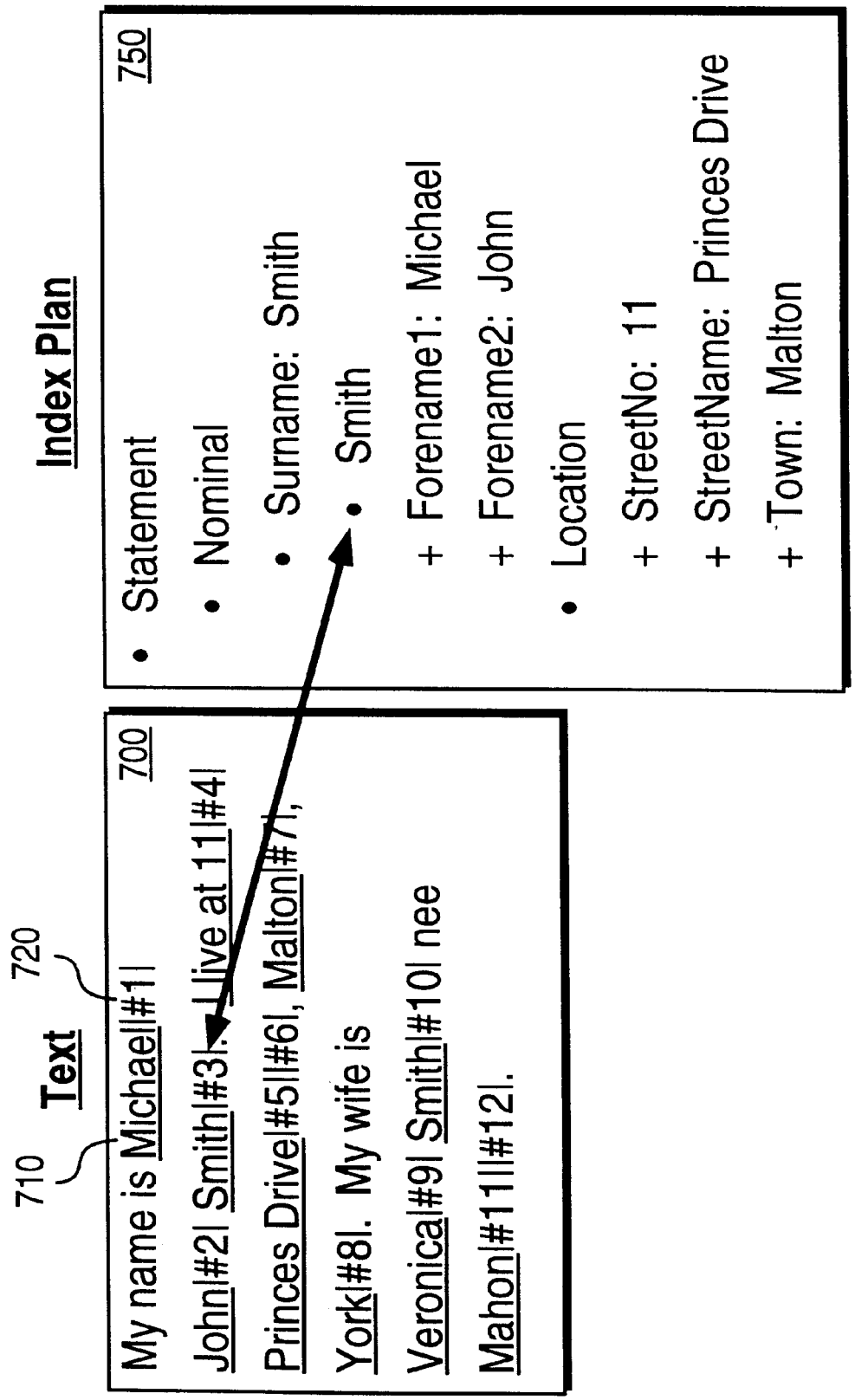
FIG. 7 illustrates an example of the visual representation of the internal text and the index plan as viewed side by side on the screen in two separate display areas.

To facilitate the review process the preferred embodiment supports navigation around and between the Marked-Up internal text and the constructed index plan. The internal text and the index plan can be viewed side by side on the screen in two separate display areas, as represented in FIG. 7. Each marked-up piece of text is followed by a superscripted index plan node number, bracketed by vertical bar characters. Whenever the insertion point in the internal text is moved onto such a node number, the corresponding node in the index plan is identified and brought into focus in the index plan. Thus the user can move the insertion point through the internal text, viewing the corresponding text extract in the index plan in parallel. Conversely the user can select any node in the index plan, and the internal text will be scrolled to the first extract which is hyperlinked to that node or else one of its children. Thus a user clicking on the visual representation of the extract node will cause the internal text to scroll to the hyperlinked piece of text in the internal text, which will also be selected. Choosing an attribute node will cause the internal text to scroll to the marked text which is hyperlinked to the first extract below that attribute node, and choosing a proposed item, will scroll to the marked text of the first extract of the first attribute with an extract below it.

RESEARCH

The goal of the research process is to retrieve and rank those records, called research hits, which are most similar to the proposed index plan item and to provide the user a number of options to respond to the research hit with an appropriate response. The research process systematically searches existing database records by using a research query object. A research query object is an object within PowerBuilder used to hold the attribute value patterns which form the basis of the research query. The attribute research patterns are either simple values or logical expressions.

The search patterns which are entered for each query object attribute can either be straightforward match values or simple logical expressions. The general syntax is:

[Operator]<Match Value> [AND|OR [Operator]<Match Value>]*

Allowed operators are =, >, <, <>, >=, <=. Parentheses are not supported in the preferred embodiment.

The match value may be quoted with either single or double quotes to prevent words in it being interpreted as operators or to force inclusion of significant characters such as leading/trailing spaces. Some examples of valid Query Attribute values are listed below. If no operator is specified then '=' is assumed.

'Smith '

Smith OR Jones

Alan OR 'Sam and Sally'

<20 OR 25

<Jones AND >Handel OR Smith

Once the user has determined that a proposed item in the index plan has been prepared satisfactorily, then it should be researched, and either consolidated into some record already in the Structured entity relationship model, or else a new database record created.

When research is invoked from a proposed index plan item all the index plan attribute values are transferred into the research query object and coerced into attribute research pattern strings. Coercion is the process of converting between one datatype and another. For example the integer 123, when coerced into a string would yield a 3 character string "123". In this case index plan attribute values can be of a variety of datatypes. All research query object attribute research patterns must be strings, since the research mechanisms are defined to work with string patterns, and a string representation facilitates the representation and manipulation of expressions such as simple disjunctions. All attribute values are therefore coerced into strings in preparation for later research.

However, in order to minimize the possibility of duplicate records being created in the database, research strategies can be defined for each type of entity or link. These research strategies make it possible to perform a wide ranging search, using many Match Rules, in a single search without user intervention. There may be many different research strategies available for each entity or link type, although in the preferred embodiment there is one default strategy. A research strategy defines exactly how research is carried out, including the weightings, types of match rules, field names to be used and reduction rules to reduce weightings when less exact Match Rules are employed.

The following table lists the Match Functions implemented in the preferred embodiment. X refers to the value of a research query research attribute, that is a value that is being searched for. Y is the value in the database table column being matched against.

TABLE 2

Description of Match Functions

| Match Function Name | Description |
| --- | --- |
| EXACT_MATCH | Straightforward X = Y match |
| TRUNCATED_MATCH | Matches first N characters of X and Y |
| RIGHTTRUNC_MATCH | Matches last N characters of X and Y |
| SOUNDEX_MATCH | Soundex matching of X and Y |
| SUBSTRING_MATCH | Succeeds if X is a substring of Y |
| WORD_MATCH | Succeeds if any of the words in X match any of the words in Y |
| SYNONYM_MATCH | Succeeds if any of the synonyms for X match Y |
| RANGE_MATCH | Succeeds if there is an overlap between the Query Attribute values and the Database Column values (e.g. Age matching) |
| DATE_MATCH | Matches X against Y where X and Y are dates/times and X may contain wildcard characters |

TABLE 2-continued

Description of Match Functions

| Match Function Name | Description |
| --- | --- |
| | (e.g. ??/02/????) or may be underspecified (e.g. '1996') |
| WILDCARD_MATCH | Matches X against Y where X may contain wildcards |
| DOUBLEWILDCARD_MATCH | Matches X against Y where both X and Y may contain wildcards |
| ALPHASEQ_MATCH | Specifically for the vehicle registration number, this rule splits X and Y into alphabetic and numeric strings and tries to match these parts (e.g. ABC123D would match T123ASE because both contain '123' |
| EVENTPERIOD_MATCH | Specifically for matching the date/time ranges in events, including movements |

For each entity type there is a corresponding research query object type. Research query objects are required because the attribute value patterns have to be represented as strings to permit logical expressions. Each research query object attribute contains the information to be searched on for a particular column, which in each case may just be a search value or may be a logical combination of search criteria (e.g. ">'Smith' AND <'Thomas'"). In most cases there is a one to one correspondence between a research query object attribute and an attribute of the associated entity, but this is not a requirement. In the preferred embodiment a research query object attribute may have no corresponding attribute in the entity object or vice versa. That is, not all columns of the corresponding entity table have to be searched, columns from other tables can be searched, columns can be searched which do not have a corresponding attribute in the query object and certain query object attributes can act as parameters to the search rather than being searched for in their own right.

Each research hit has a hit score or rank associated with it of between 0 and 100%. A minimum hit score can be specified by the user to restrict the research hits shown in the Hit List. In most cases the research hits are sorted in order of decreasing hit score, although Event Research, as described later, is an exception. Sufficient information is provided in the Hit List to highlight in the user interface, with matching columns in green and columns which failed to match in red.

The transference of attribute value information into a research query object commences by transferring all attribute values from the index plan proposed item, into corresponding query attributes of a research query object of the corresponding type. Validated attribute values are simply mapped across to corresponding research query object attributes. All attribute values are coerced into valid query strings.

Where no validated value is available for an attribute, a value is picked up from the first extract node below the attribute node in question in the index plan. Although this value is not validated it is transferred into the research query object because there is a chance that it may be sufficiently similar to allowable values for it to match through one of the more relaxed match rules. Where an attribute is repeated in the index plan for whatever reason, a disjunction "Value 1 OR Value2 OR . . ." is passed as a single entry into the research query object attribute. Extended attributes, which are permitted to have multiple values, are handled in the same manner but only where the extended attribute has only a single attribute. For example, the extended attribute, nominal clothing is an extended attribute which carries only a description attribute. Any nominal can have any number of clothing extended attributes, and where two or more clothing attributes exist on a proposed item these are combined into a disjunction. In the preferred embodiment, extended attributes with more than one attributes are not treated in this way, instead only the first extended attribute is transferred into its corresponding research query object attribute. With these mechanisms as much information as possible is passed across to the research query object.

The research strategy selected to research an index plan item defines exactly how research gets carried out. The definition of a research strategy is held centrally in a database and consists of three main tables, a strategy table, a strategy group table and a strategy rule table.

The strategy table names all research strategies known to the system, and lists the entities or links to which they can be applied. A strategy group table is used to define which research query object attributes are to be matched against which database table columns, together with positive and negative weighting factors used in calculating an overall research hit score. Each record of the strategy group table includes a strategy name, the attribute group name, a list of research query object attribute names, a list of database table column names, a positive weighting factor, a negative weighting factor, and an enabled/disabled flag. A research strategy can have many associated attribute groups. Attribute and column names are all specified in a TableName.ColumnName format such that any table or column can be employed.

For each entry in the strategy group table there may be several entries in the strategy rule table. This table defines the Match Rules which can be applied to the research query object attribute in each strategy group table. A strategy rule may be applied to all the research query object attribute and hit list columns listed in its strategy group table, or to just a subset of these lists. Each record of the strategy rule table includes the attribute group name, a Match Function name, a list of research query object attribute names, a list of database table column names, a reduction weighting factor, one or more match function parameters, and an enabled/disabled flag. Each attribute group in the strategy rule table can be associated with many strategy rules, however, the strategy rule table must include these lists since each individual Match Rule can be applied to different sets of attributes and columns. Similar information is also maintained on the strategy group table for implementation convenience and efficiency.

In the simplest form a strategy group table would list a single research query object attribute to be matched against a single database table column. Each of the Match Rules listed in the strategy rule table would be applied in turn to the specified attribute and column. In a more complicated strategy group cross searching can be specified in which, for example, FirstName and SecondName can be matched against ForeNames1, 2 & 3.

The operation of each match function may also be modified by parameters described in the particular Strategy Rule. The following table lists the permitted parameters and parameter values in the preferred embodiment:

| Parameters | Values | Description |
| --- | --- | --- |
| MATCH | CROSS | Does cross matching between the research query object attributes and the Database Table Columns (e.g. match FirstName and MiddleName against Forename1, Forename2 and Forename3) |
| | PAIR | Does paired matching (e.g.. If Exact Match between research query object attribute1 with Column1, then apply match rule between Attribute2 and Column2) |
| REDUCE | % reduction | Specifies the percentage reduction which should be applied to a cross match rule when the match is 'out-of-place' (e.g. FirstName matches Forename2) |
| SPLITHYPHEN | Y or N | If set to Y splits tokens containing hyphens and treats the pieces as search values in their own right (e.g. Hayward-Shott would become Hayward OR Shott) |
| TRUNC | trunc len | Specifies the truncation length for TRUNC_MATCH and RIGHTTRUNC_MATCH |

The SOL Inserts used in the preferred embodiment to set up the Research strategy, Strategy Groups and Strategy Rules are set forth in the MASTER.XLS Appendix A below.

THE RESEARCH PROCESS

Research is carried out from the index plan , in which case values for the research query object attributes are automatically transferred into the research form. Validated Attribute values are simply mapped across to corresponding research query object attributes. All attribute values are coerced into valid Query Strings. Where no validated value is available for an attribute, a value is picked up from the first Extract below the Attribute in question in the index plan . Although this value is not validated it is transferred into the research query object because there is a chance that it may be sufficiently similar to allowable values for it to match through one of the more relaxed match rules. Where an attribute is repeated in the index plan for whatever reason, a disjunction "Value1 OR Value2 OR . . . " is passed as a single entry into the research query object attribute from the index plan item. With these mechanisms as much information as possible is passed across to the research query object as possible. In the preferred embodiment only one set of extended attribute values can be transferred into the research query object for each type of extended attribute.

APPLY A RESEARCH STRATEGY

Once the Query Object has been populated, the Research strategy is loaded. The Strategy Attribute groups are checked, and any research query object attributes which are not required by at least one Strategy Attribute Group are eliminated from the search. This may occur if, for example, the user has decided to disable searching on certain Query Attributes in order to streamline the research process, or to ignore dubious data. In the preferred embodiment an interface is provided by which strategy groups can be turned on or off as required by means of a simple check box per group. In this same interface the user can adjust the positive and negative weightings.

When a search is initiated, the Strategy Attribute Groups are examined for possible relevance to the search criteria. Any Strategy Groups on which searching has been disabled are ignored. Similarly any Strategy Groups for which all the Query Attributes are empty are ignored. In this way only enabled Strategy Groups for which there are some search value(s) are considered.

Figure 6:
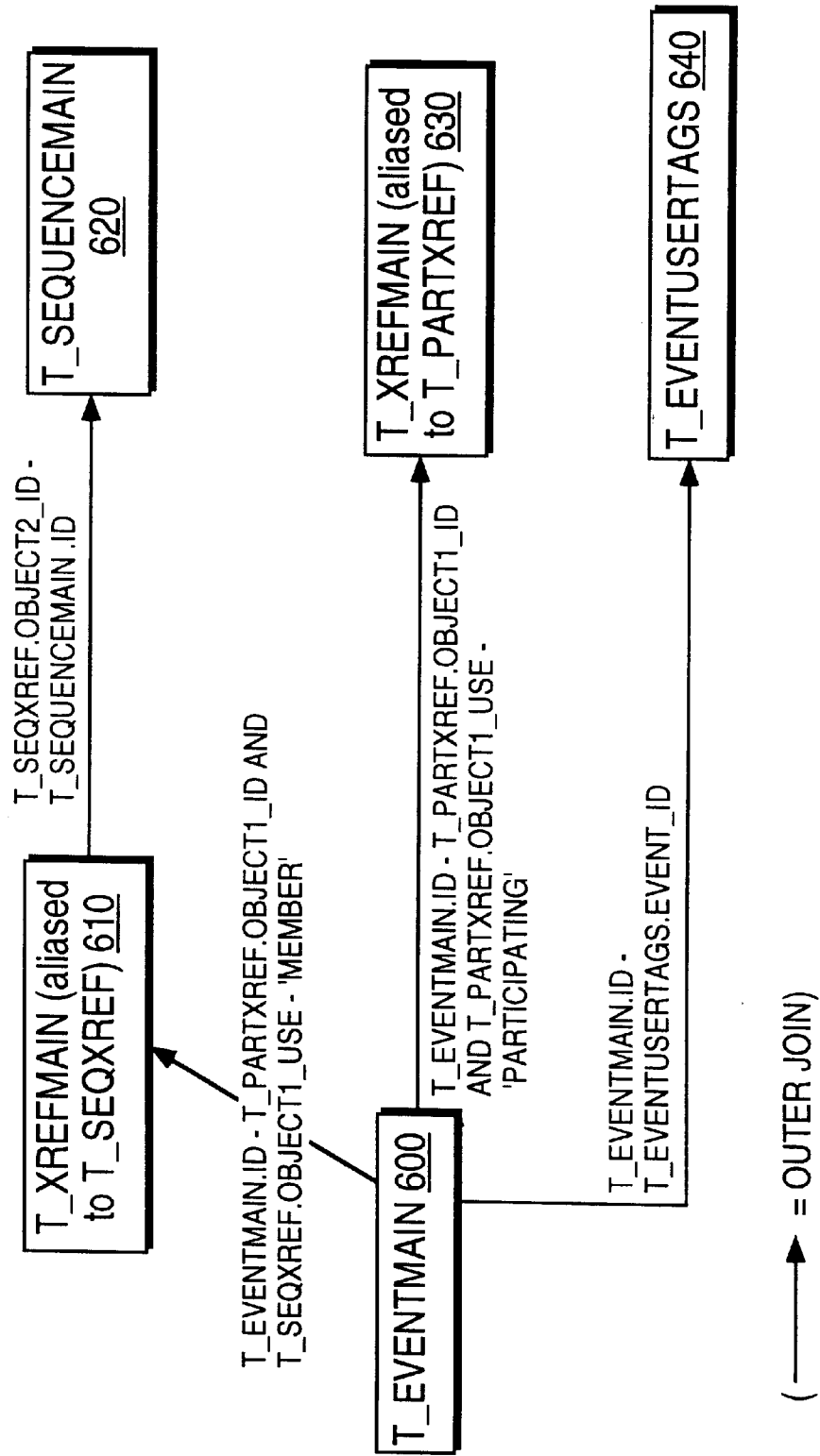
FIG. 6 illustrates an example of the structure for an event research as used in the preferred embodiment of the present invention.

For each of the remaining Strategy Groups the list of associated Database columns, which are in table.column format, is examined to find out which tables are required during the research. For most search operations the Database columns to be matched against do not all reside in one table, so a tree structure is consulted to decide which tables and join conditions should be included in a query. As an example, FIG. 6, represents the appropriate structure for Event Research:

if a strategy attribute group refers to a database column in T_SEQUENCEMAIN, then T_LSEQUENCEMAIN, T_SEQXREF and T_EVENTMAIN are all flagged for inclusion in the search query. This approach reduces the number of cross table outer joins in those cases where the user isn't interested in the contents of detail tables or other entity tables.

The Strategy rules for each Strategy Attribute Group are examined, and disabled rules are ignored. The remaining rules are used to generate Search Clause structures which will be used in the Research Query. The Search Clause structures include information about the group and rule, the score for the hit if the search clause succeeds, the client and SOL based match clauses, the Database columns on which the match is being performed, a description of the match and information about how the score is calculated. The last three of these are particularly used for describing the hit if the results of the research need to be presented to a user.

Each Strategy Rule uses one of the defined Match Functions in the system to generate an appropriate Search Clause structure (or structures). Each Match Function takes the list of Database Columns and Query Attributes defined in a Strategy Rule and generates a Search Clause which describes a particular type of search.

Although each Match Function may be coded separately, there is a general structure for all Match Functions which is used throughout, and which is described below.

Each match function is passed a template Search Clause structure which contains pre-set values for the group and rule and default values for the score setting. The Query Attribute names, Database Column names and Parameters from the Search Rule are also passed to the Match Function as are any parameters relevant to the whole search (in the preferred embodiment there is one option for Case Sensitive/Insensitive match).

The Match Function typically tokenizes the Query Attribute strings according to the syntax described earlier in this document. The generated tokens are then checked to ensure that they define a sensible query for the particular Match Function. For example, the SOUNDEX_MATCH function performs a transformation on the values matched which means that use of the '>', '>=', '<' and '<=' operators is not sensible. In these cases the Match function will try to reduce the query to include just those parts which are relevant. In the following example the SOUNDEX_MATCH function would reduce the query:

'JONES OR JONSON OR >SMITH AND<THOMAS' to just:

'JONES OR JONSON'

In those cases where no part of the search string can be used by a Match Function, the function will not generate a Search Clause.

After removing unused parts of the query, the search values in the list of tokens may be expanded according to the requirements of the particular match function. For example, the SYNONYM_MATCH match function would expand the list of tokens for:

'ALAN OR ALF' into:

'ALAN OR ALLEN OR ALUN OR ALEN OR ALF OR ALFRED OR FRED'

A similar operation is performed for the EXACT_MATCH function when the SPLITHYPHEN parameter is defined. In other cases the tokens themselves may be transformed to fit the requirements of the search At this point the list of search tokens has reached its final form, and generation of the Search Clauses can begin. The central part of each Search Clause structure is a pair of strings which are evaluated to decide if the rule matches or not. The first of these strings (the Server Match String) is SQL based, and is essentially a condition to be used in an SQL WHERE clause. The second string (the Client Match String) is again a condition, but in this case is a fragment of PowerBuilder code which can be evaluated on the client. The Server and Client Match Strings are not in general the same, and may even perform completely different functions, with the proviso that the Server Match String when executed should not exclude any database rows which the Client Match String would include. This strategy provides an effective method of tailoring database performance by trading off the number of rows retrieved from the database against the amount of work which has to be done on the client side of the application. It also allows the application to provide database independence where functions are not available on a particular database server (the SOUNDEX_MATCH function generates a Server Match String which just checks the initial letter of the column, and the full Soundex match is performed on the client)

The Match Function typically generates the Server and Client Match Strings from template strings which define how a single Operator/Match Value pair (e.g. '=SMITH') is combined with the search column. As an example, the TRUNC_MATCH rule uses a Server Match String template of:

'substr(Column, 1, TruncLength) Operator substr(MatchValue, 1, TruncLength)' and a Client Match String template of:

'left(Column, TruncLength) Operator left(MatchValue, TruncLength)'

These templates are used to generate Match Strings for each operator/Match Value pair in the Query attribute value which are then concatenated together by the conjunction operators used in the Query attribute value.

Once the Match Strings have been generated, a new Search Clause is created from the template Search Clause, to which are added the Server and Client Match Strings, together with any useful information which the user might want to know about the match function as applied to the current Strategy Rule, including a list of the columns which must have matched if the Server and Client Match Strings evaluate to TRUE.

In some cases a Match Function may generate more than one Search Clause, particularly where it is important that the user be able to distinguish which of several possible Database Columns matched the Query Attribute search condition. A typical example is the Cross-match searching of a First Name which may be checked against several forename fields in the database. In this case the Match Function will generate separate Search Clauses for each cross match combination (e.g. FirstName/Forename1, FirstName/ForeName2, FirstName/ForeName3 etc.). In each generated Search Clause structure the list of matching database columns will be limited to just the single database column which that Search Clause tests,—this information can be used later in highlighting columns in the Hit List in the user interface. It is also possible for each Search Clause to have slightly different scores—this is how the REDUCE parameter works.

Once Search Clauses have been created for all the enabled Strategy Groups in the current Strategy, the list of Search Clauses is used to generate complete query strings for both the Database server and the client.

The Database Query is generated by concatenating all the Server Match Strings from the Search Clauses together separated by OR keywords. The resulting string is used as the WHERE condition for an SOL SELECT statement. The list of columns to retrieve, the tables to retrieve the data from and the join conditions between those tables are generated from the list of flagged tables created earlier.

The Client Match Strings are used to generate a PowerBuilder evaluation string which is used to calculate the hit score for a retrieved row in the database. The hit score is calculated in the following manner.

1) If one or more of the Client Match Strings for a particular Strategy Group evaluates to TRUE, then the best score of the matching Client Match Strings for that Strategy Group is added to the total hit score 2) If none of the Client Match Strings for a Strategy Group evaluate to TRUE, but all the Database Columns which the Strategy Rules for that Group reference are NULL, the total hit score is not changed. This allows the system to distinguish between the cases where the matched record may not contain any data, and the case where the data actually fails to match.

3) If all of the Client Match Strings for a Strategy Group evaluate to FALSE, that Strategy Group has failed to match and the Negative Weighting factor for that Strategy Group is subtracted from the total hit score The hit score is normalized by dividing the total score by the sum of the maximum positive match scores to create a percentage hit value.

In the preferred embodiment the hit score is calculated using the conditional attributes of the PowerBuilder datawindow object to interpret the Client Match Strings.

By using this combination of client and server matching functions, the Research form Hit List is populated with matching rows in the database. In cases where the search has included one or more detail tables to the main Entity table, the Hit list may contain duplicate entries for each entity due to the typical generation of a Cartesian product when using SQL joins across tables. The duplicates are filtered from the Hit List so that only the best match for each entity is displayed.

RANKING AND SORTING THE RESEARCH HITS

In the preferred embodiment the hit score is built up from various weightings and reduction factors for each hit included in the Hit List. For each Strategy Group actually involved in the Match Positive and Negative Weightings are retrieved. For example for a Nominal, the Surname Group might have weightings of (50, −25), the Forename1 Group (25, −13), Forename2 Group (20, −12) and the Occupation Group (5, 0), where the first number is the positive weighting and the second is the negative weighting. Each Match Function as applied in a Strategy Rule also has an associated Reduction Factor. For example for Surname we might have 100% for Exact Match, 90% for Soundex, and 80% for Truncated (3).

Each Strategy Group contributes a value to the overall hit score as follows. If the group has successfully matched, then the contribution would be the Group Positive Weighting multiplied by the Reduction Factor of the best Match Function used. Thus for example for Forename1, matched using Truncated, we might have 25×80%. A further reduction can be specified as a parameter to the Strategy Rule, to deal with the case where Forename2 in the research query object has successfully been matched against Forename2 in the entity table. For example if a Reduce parameter of 5% had been applied then the final contribution from Forename1, if successfully matched against Forename would be 25×80%×95%. Where the match is unsuccessful then the contribution is imply the negative weighting for the Strategy Group. For example if Surname did not match then the contribution would be −25.

Having worked out the contribution for each Strategy group, these are summed together to give a Total Contribution. This is then divided by the sum of the maximum positive weightings for each strategy group involved to form the overall hit score. For example if the Surname did not match, and the Forenamel matched using Truncated on Forename2, then the overall hit score would be (−25+(25× 80% ×95%))/(50+25).

As stated above the SQL Inserts used in the preferred embodiment to set up the Research strategy, Strategy Groups and Strategy Rules are set forth hereinbelow in Appendix A.

In particular these inserts contain the positive and negative weightings for each group. They also contain the reduction factors.

A list of research hits is compiled, ranked and sorted. Hits with negative ranking, or a ranking below a user defined threshold are discarded. The remaining positively ranked research hits are presented to the user, before unification, record creation, unification and record linking takes place.

TAGGING THE RESEARCH HITS FOR LATER UNITFICATION

Having researched a Proposed index plan Item the user is presented with a list of research hits, and the user has to decide what needs to be done. In the preferred embodiment the following options are available for all entities except Events:

CREATE NEW RECORD—this is used when the user is sure that the Proposed Item does not already exist in the Structured entity relationship model. All the attribute values on the Proposed Item are transferred into the new record, and a Cross Reference is constructed between the Source Document and this new entity record. Finally the Proposed Item Node in the index plan is updated with the Record Number, and computed summary string for the newly created entity or link.

TAG RESEARCH HIT AS EQUAL—this can be performed on one research hit.

Its meaning is that the Proposed Item attribute values will get consolidated into the Equal Tagged Hit Record, and a Cross Reference is constructed between the Source Document and this entity record. Finally the Proposed Item Node in the index plan is updated with the Record Number, and computed summary string for the research hit record.

TAG RESEARCH HIT AS IDENTICAL? —this can be performed on any number of research hits, and in combination with a single Equal Tag. Its meaning is dependent upon whether there is a research hit tagged as Equal. If there is then all research hits tagged as Identical? will be cross referenced as Identical? with the Equal research hit.

If there is no Equal research hit then a new record is created and dealt with as for Create new Record. In addition this new record is cross referenced as Identical? with all those research hits tagged as Identical?

Events are handled slightly differently in the preferred embodiment since the requirement in criminal investigation for handling events is more specific. In the preferred embodiment, when researching events, the requirement is find existing events which either corroborate or conflict with the event being researched. A new event record is created for every event extracted from the Internal Text. The reason for this is that the events are to represent an individual witness's description of an event in time. In this sense two event descriptions are very rarely exactly the same. The tagging process for events therefore offers two alternatives:

TAG AS CONFIRMATORY—a new event record will be created for the proposed event item, and cross referenced to this tagged research hit as Confirmatory.

TAG AS CONFLICTING—a new event record will be created for the proposed event item, and cross referenced to this tagged research hit as Conflicting Any number of research hits can be tagged, and each are treated as described above, although only one new record is created.

UNIFICATION

Unification occurs if one of the research hits can be deemed to be equal to the Proposed Item. In the preferred embodiment the selection of an Equal research hit is performed by the end user of the system. If there is no Equal research hit then the user can create a new record in the database. Either way the Proposed Item becomes Unified with the Equal research hit Record from the database, a link is created between the Source Document and this record, and the Item node in the index plan is updated with the record Number and Summary of the database record. This has two important consequences: first the record with which the index plan item has been unified can be accessed directly from the index plan item, that is the user can move directly from the Source Document to Entities or Links which have been extracted from it. Second the user can navigation from any entity or link to any source document which gave rise to or gave support to its existence in the database.

CONSOLIDATION PROPOSED ITEM ATTRIBUTE VALUES INTO A DATABASE RECORD

Consolidation occurs immediately after the selection of an Equal research hit Record. The attribute values held under the Proposed Item need to be merged into the Equal research hit Record.

Any attribute values of a newly Unified Item need to be merged (consolidated) into the existing database record. Completely new attribute values, that is attributes which have no current value in the database record, can be simply copied into the existing record. Attributes which have a value both in the proposed item and the existing database record, require some user intervention to select the preferred value. In the preferred embodiment actions can be recorded to further investigate clashing attribute values.

After consolidation the record is again subject to the application of validation rules to ensure that data integrity is maintained, as outlined in the data entry section.

CREATING NEW DATABASE RECORD AND CROSS-REFERENCING RESEARCH HITS

In the preferred embodiment if there is any doubt about the equality of proposed and the existing, then a new record can be created and an "Identical?" link is made between the two.

MICHROFICHE APPENDIX

Attached as an microfiche Appendix is the MASTER.XLS spreadsheet specifying the required content of the Structured entity relationship model, the Grammar Rules, the Application Data Tables, Application Defintions, and Research rules as used in the prefered embodiment. The MASTER.XLS spreadsheet specifies the required content of the Structured entity relationship model. The Grammar Rules are those rules used in the prefered embodiment, as defined by the Grammar specification above. The Application Data Tables describe all the database tables that are used to store the actual records created in the Structured entity relationship model. The tables in the Application Data Tables—schema Report with the prefix "L__" contain details of the field lookup values such as the list of valid entries for the Title field on the Nominal entity. Tables with the prefix "T__" contain details of the entities and documents such as Nominal or Statement. Tables with the prefix "W__" are database views, rather than tables, and are used by the Analysis Tool. The Application Definitions describe all the database tables used by the Definitions Server that contain all the information that the application needs to be able to run. The records in these tables describe each and every document, entity, and form and their interrelationships held in the Application Data Tables which store the Structured entity relationship model.

What is claimed is:

1. A method for combining types of items of information from a plurality of text-based information sources in a plurality of formats, into items in a database, with
   at least one information source including unstructured written text and structured text, and
   at least one item of information including one or more attributes, with each attribute having at least one value,
   the method comprising the steps of:
      for each information source,
         extracting and organizing items of information from the structured and unstructured written text of the information source, to generate an index plan, with each item in the plan organized as a hierarchic data structure representing the item's attributes, their values and the locations of the text in the information source supporting those values; and
         researching and consolidating the items of information in the index plan into items in the database to avoid duplication of items in the database.

2. The method as recited in claim 1 wherein the items can be edited by a user.

3. The method as recited in claim 1 wherein each information source can include zero or more items of information.

4. The method as recited in claim 1 wherein each information source can include zero or more types of items of information.

5. The method as recited in claim 1 wherein the step of researching includes the step of automatically formulating and applying a SOL query.

6. The method as recited in claim 1 wherein the step of researching includes the step of creating an item in the database if that item in the index plan is not in the database.

7. The method as recited in claim 1 wherein the locations of the text in the information source supporting values in the items of the index plan are preserved in the database.

8. The method as recited in claim 1 wherein each item in the database can be traced to at least one item in an index plan.

9. The method as recited in claim 1 further comprising the step of validating the integrity of the information in the items.

10. A system for combining types of items of information from a plurality of text-based information sources in a plurality of formats, into items in a database, with
    at least one information source including unstructured written text and structured text, and
    at least one item of information including one or more attributes, with each attribute having at least one value,
    the system comprising:
       an extractor configured to extract and organize items of information from the structured and unstructured written text of each information source, to generate an index plan, with each item in the plan organized as a hierarchic data structure representing the item's attributes, their values and the locations of the text in the information source supporting those values; and
       a research mechanism configured to research and consolidate the items of information in the index plan into items in the database to avoid duplication of items in the database.

11. The system as recited in claim 10 further comprising an input mechanism to allow a user to edit the items.

12. The system as recited in claim 10 wherein the research mechanism automatically formulates and applies a SOL query.

13. The system as recited in claim 10 wherein the research mechanism creates an item in the database if that item in the index plan is not in the database.

14. The system as recited in claim 10 wherein each item in the database can be traced to at least one item in an index plan.

15. The system as recited in claim 10 wherein the research mechanism determines the degree an item in the index plan matches an item in the database.

16. The system as recited in claim 10 further comprising a validator configured to validate the integrity of the information in the items.

* * * * *